Figure 32:
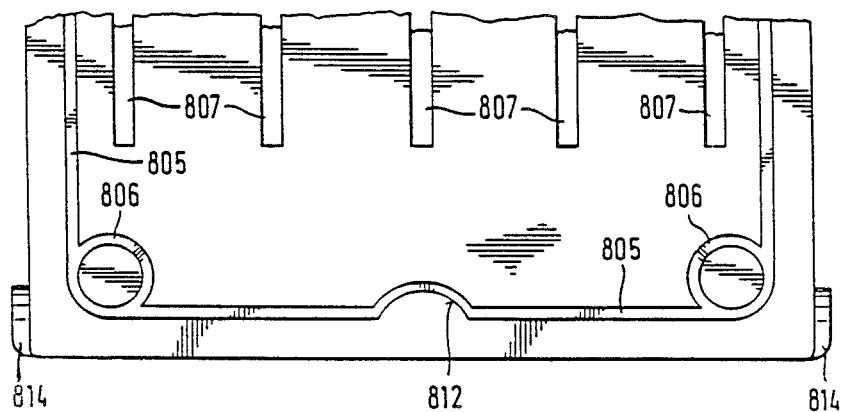

United States Patent [19]
Ackeret

[11] Patent Number: 4,842,348
[45] Date of Patent: * Jun. 27, 1989

[54] CONTAINER FOR THE STORAGE OF MAGNETIC-TAPE CASSETTES OF OTHER RECORDING MEDIA

[75] Inventor: Peter Ackeret, Kusnacht, Switzerland

[73] Assignee: IDN Inventions and Development of Novelties AG, Switzerland

[*] Notice: The portion of the term of this patent subsequent to Oct. 18, 2005 has been disclaimed.

[21] Appl. No.: 906,426

[22] Filed: Sep. 12, 1986

Related U.S. Application Data

[60] Division of Ser. No. 735,293, May 17, 1985, abandoned, which is a continuation of Ser. No. 456,392, Jan. 7, 1983, abandoned.

[30] Foreign Application Priority Data

Jan. 20, 1982 [DE] Fed. Rep. of Germany ....... 3201486

[51] Int. Cl.[4] .............................................. A47B 81/06
[52] U.S. Cl. ........................................ 312/12; 312/323
[58] Field of Search ..................... 206/387; 312/9-18, 312/323, 319, 322, 333

[56] References Cited

U.S. PATENT DOCUMENTS

| | | | |
|---|---|---|---|
| 2,809,085 | 10/1957 | Fall | 312/323 |
| 4,399,913 | 8/1983 | Gelardi et al. | 312/10 X |
| 4,592,600 | 6/1986 | Ackeret | 312/12 |
| 4,717,213 | 1/1988 | Ackeret | 312/12 |
| 4,743,077 | 5/1988 | Ackeret | 312/12 |

FOREIGN PATENT DOCUMENTS

| | | |
|---|---|---|
| 518504 | of 1978 | Australia . |
| 373396 | 4/1923 | Fed. Rep. of Germany . |
| 2248408 | 1/1974 | Fed. Rep. of Germany . |
| 2343487 | 3/1974 | Fed. Rep. of Germany . |
| 2729492 | 1/1979 | Fed. Rep. of Germany . |
| 7917351 | 5/1980 | Fed. Rep. of Germany . |
| 2457094 | 12/1980 | France . |
| 2077234 | 12/1981 | United Kingdom . |
| 2102768 | of 1983 | United Kingdom . |

*Primary Examiner*—Joseph Falk
*Attorney, Agent, or Firm*—Banner, Birch, McKie & Beckett

[57] ABSTRACT

A container for video magnetic-tape cassettes, compact phonographic disks or similar recording media, with a housing and a slide which is displaceable into an opening position by a prestressing spring after a lock has been released. The slide carries a front plate which closes the housing and which moves aside during opening, so that the cassette or the like can be grasped conveniently. A common housing preferably contains several slides. A blocking lock can be provided. Outwardly identical housings can contain slides adapted either to cassettes or to compact phonographic disks or to other recording media.

21 Claims, 33 Drawing Sheets

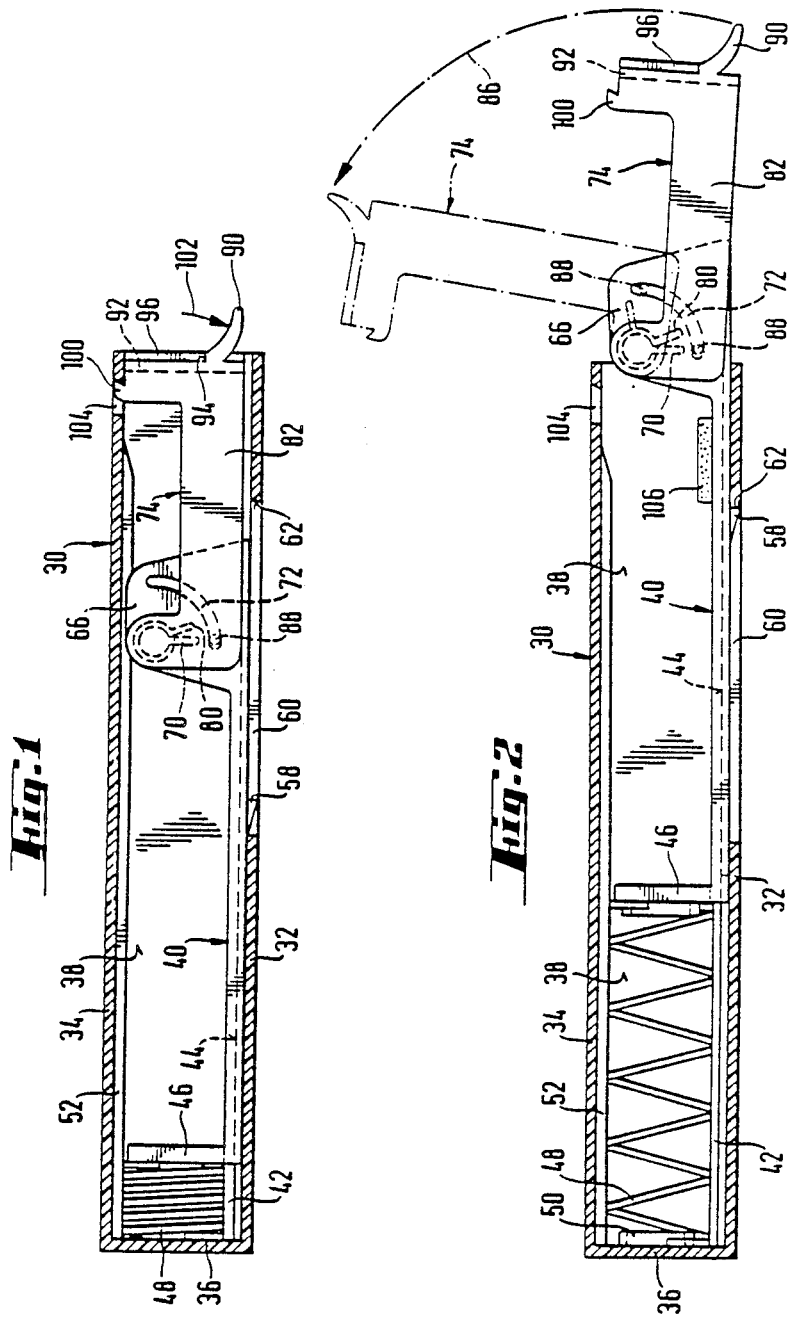

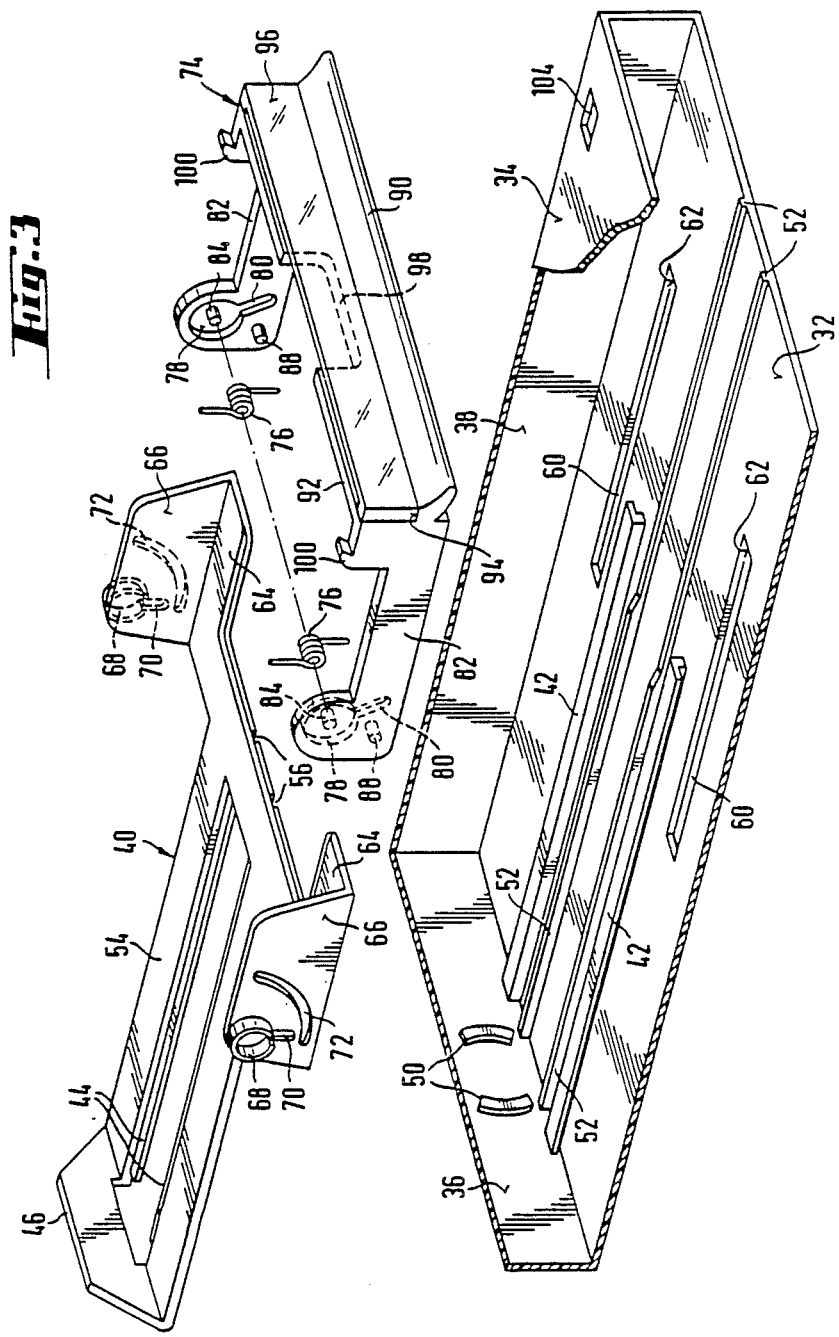

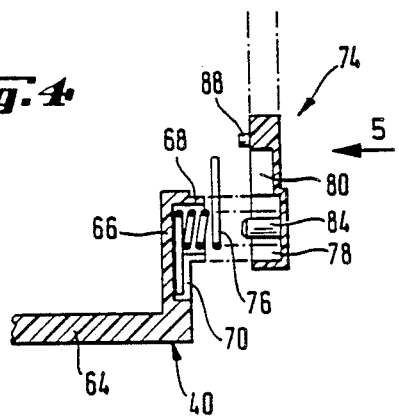
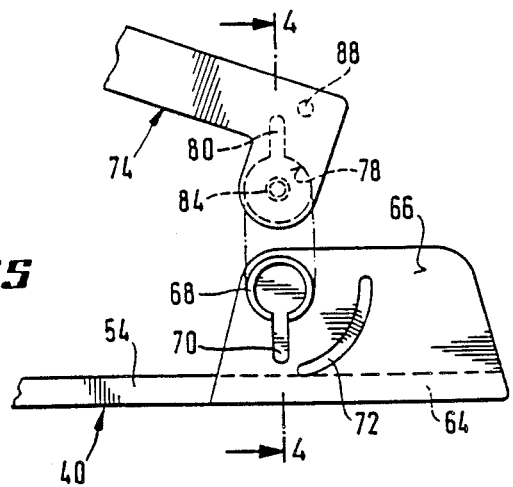

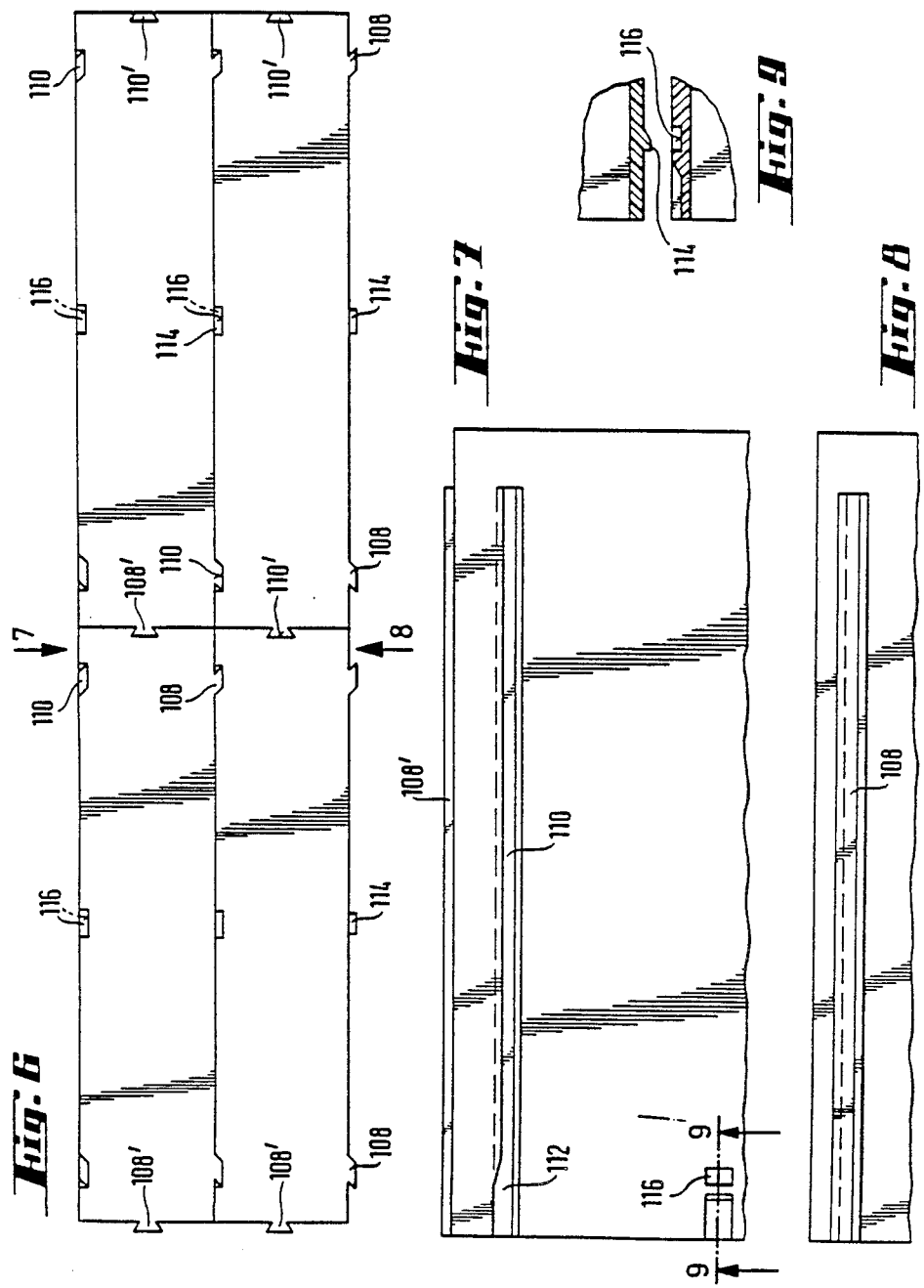

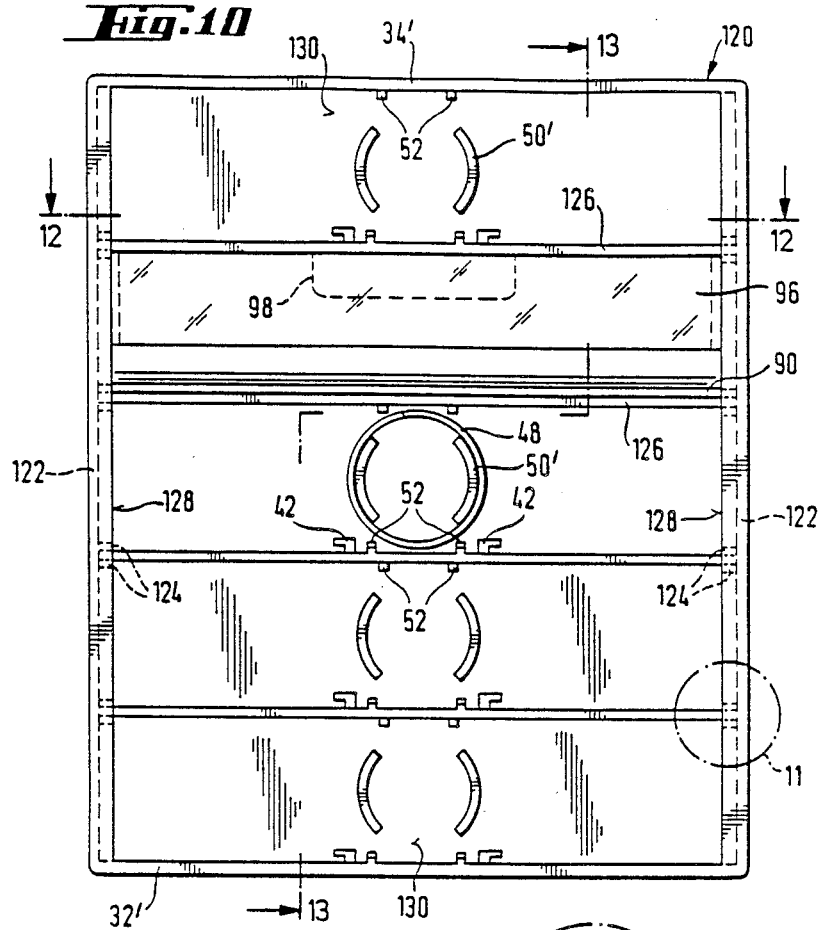
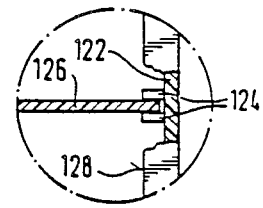
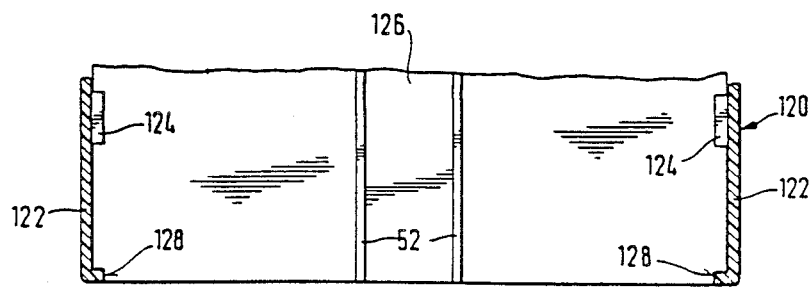

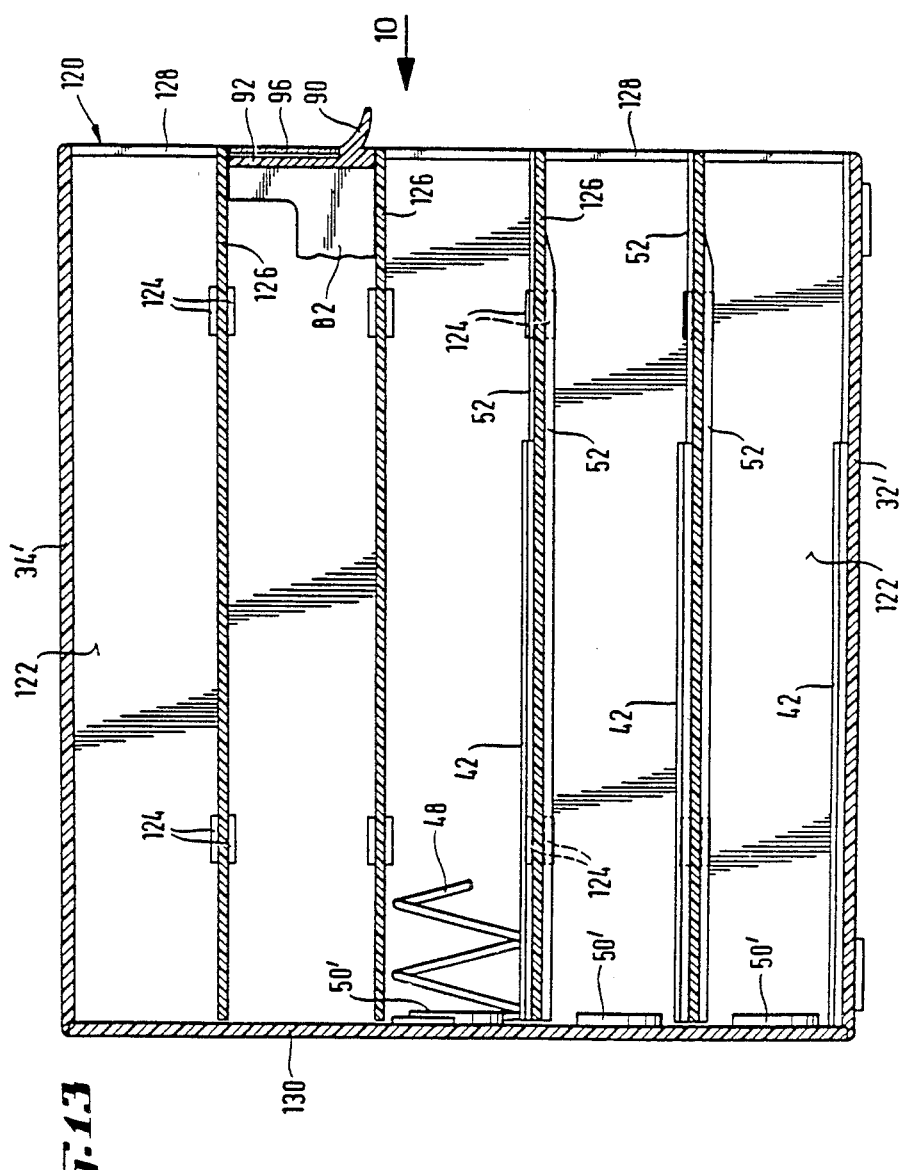

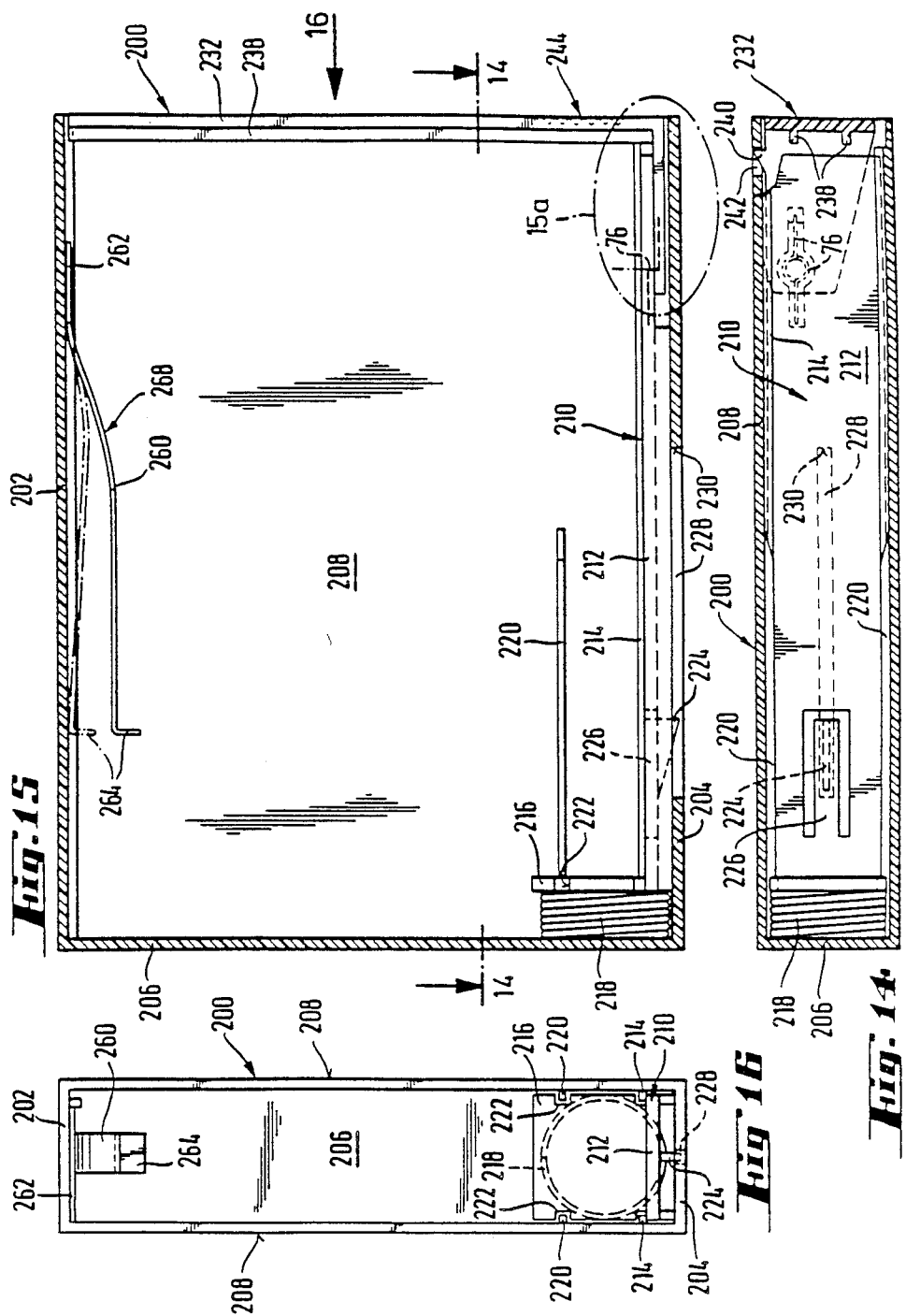

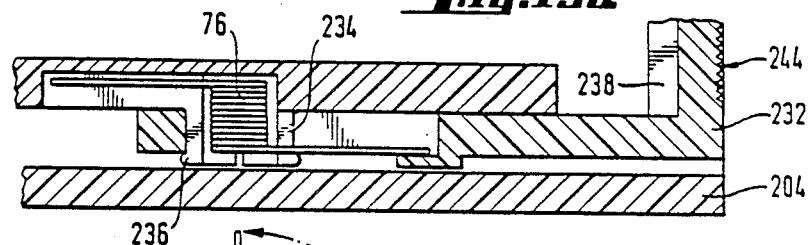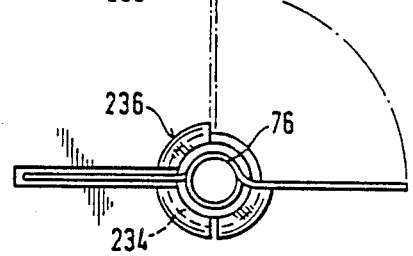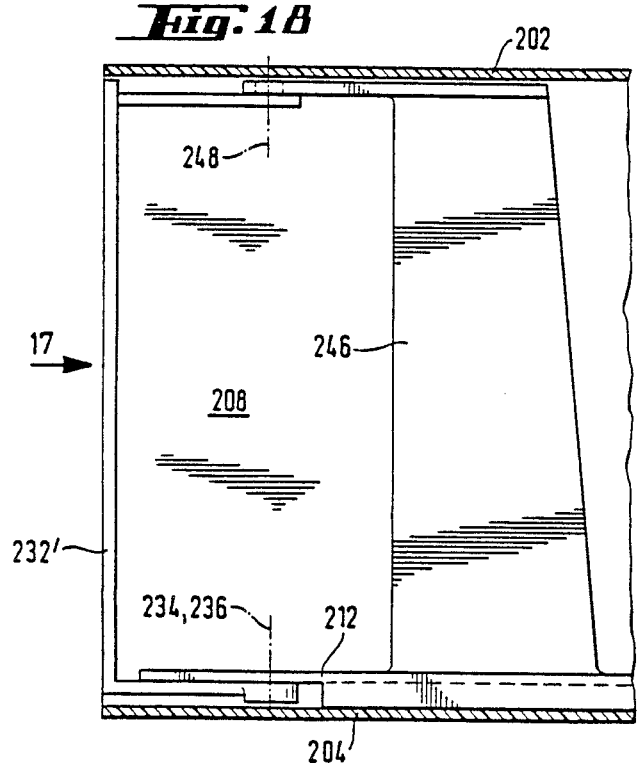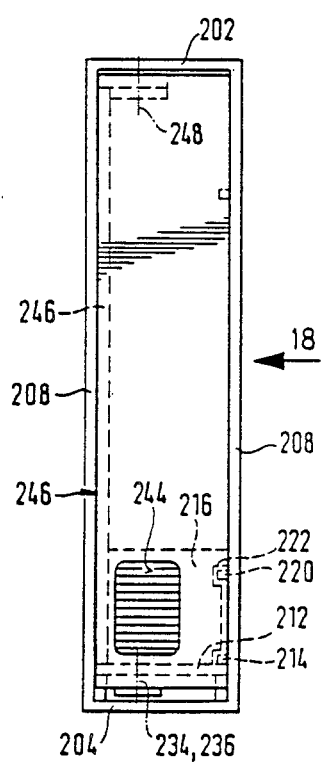

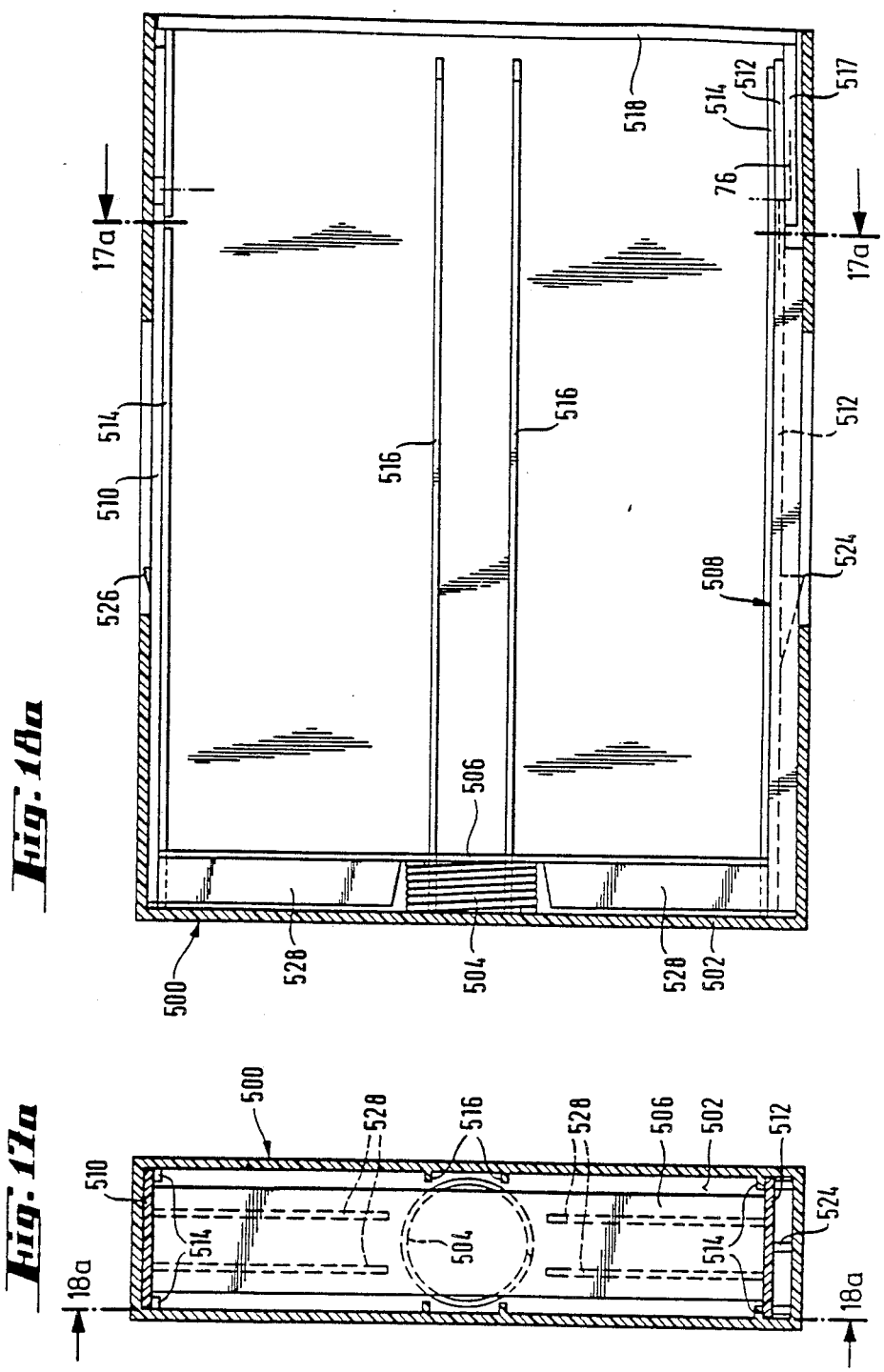

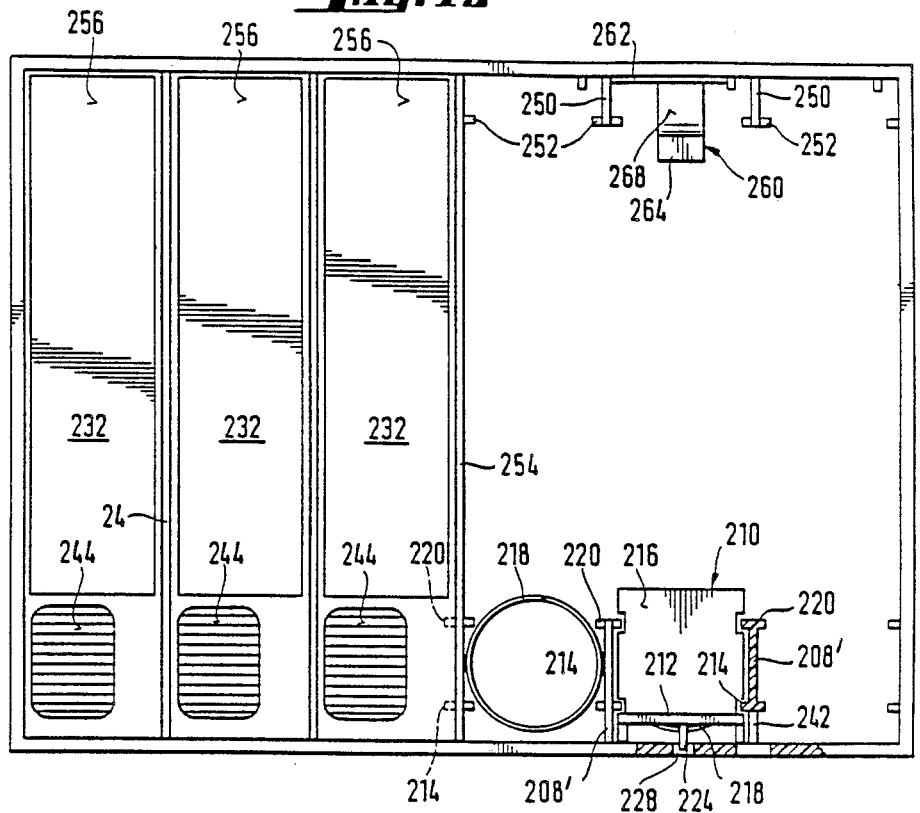
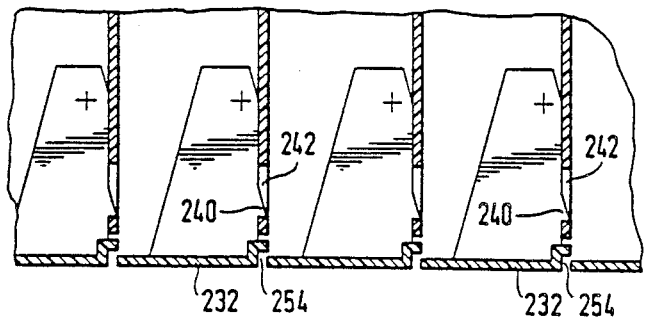

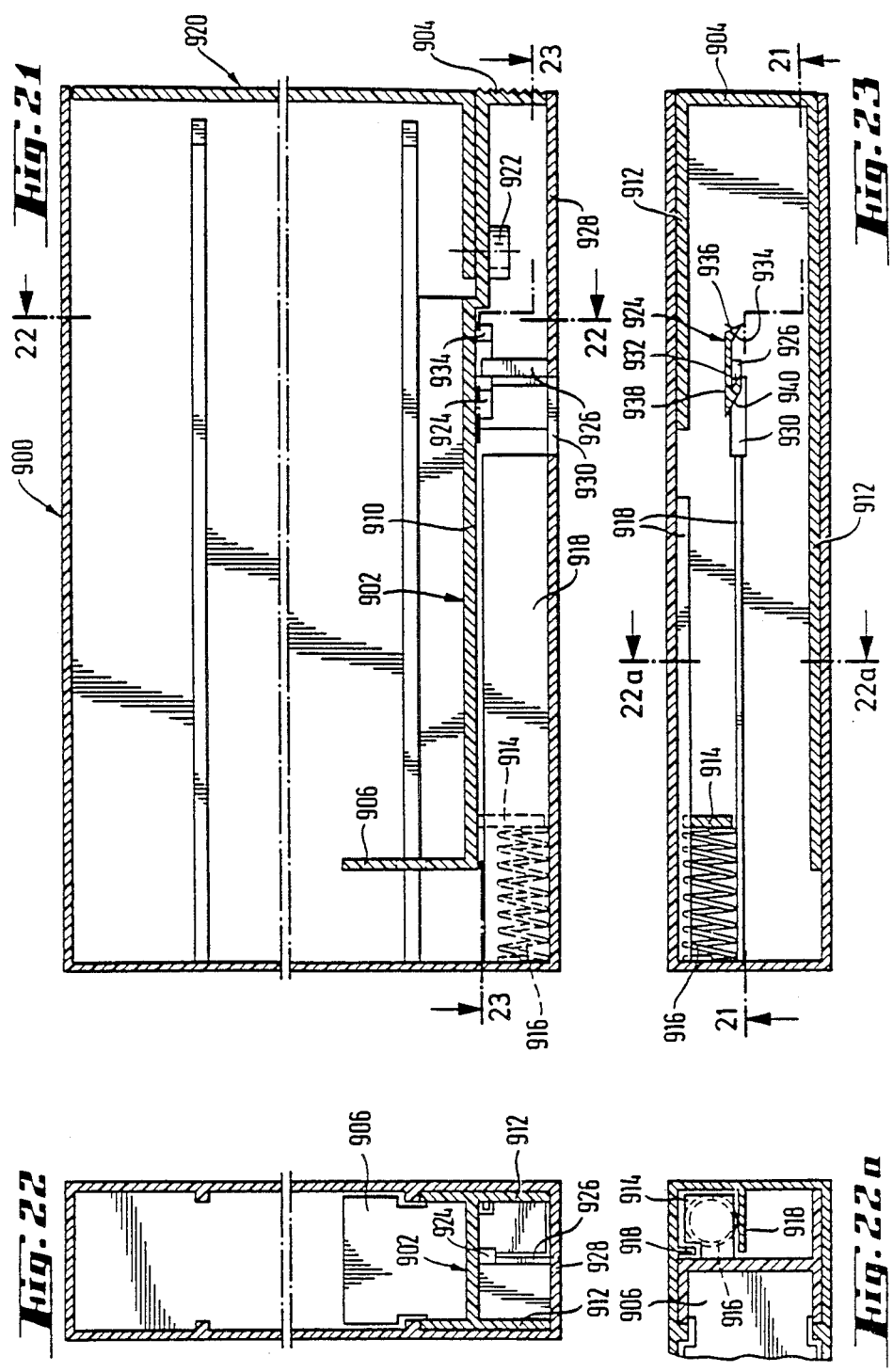

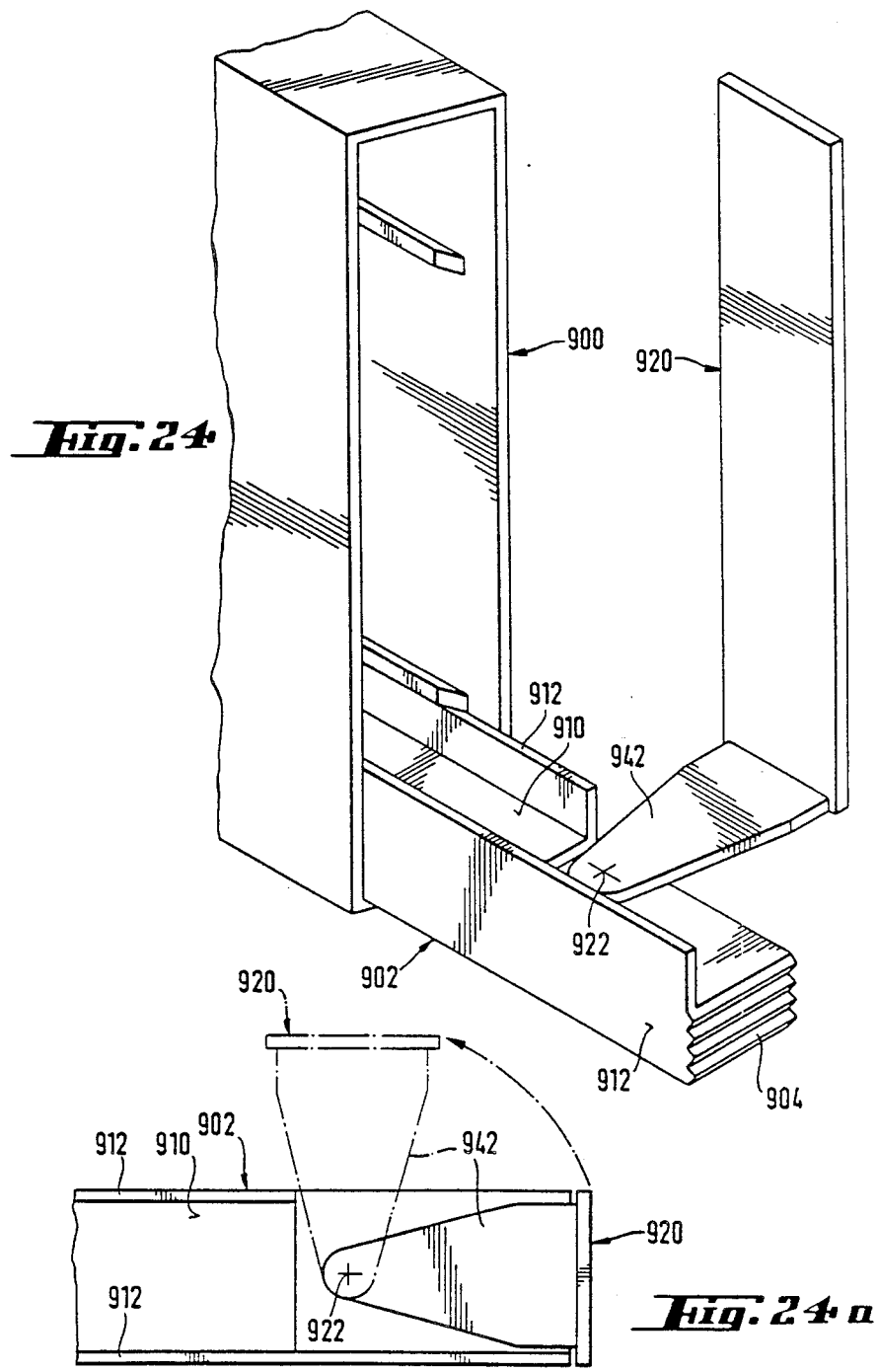

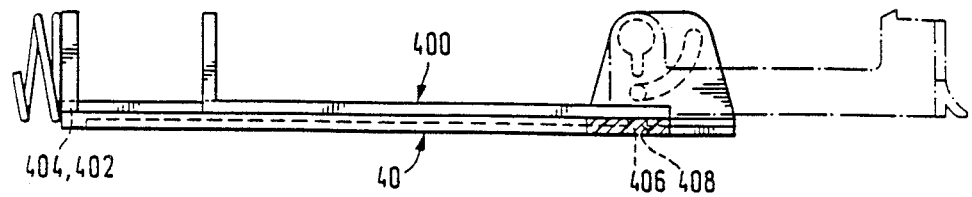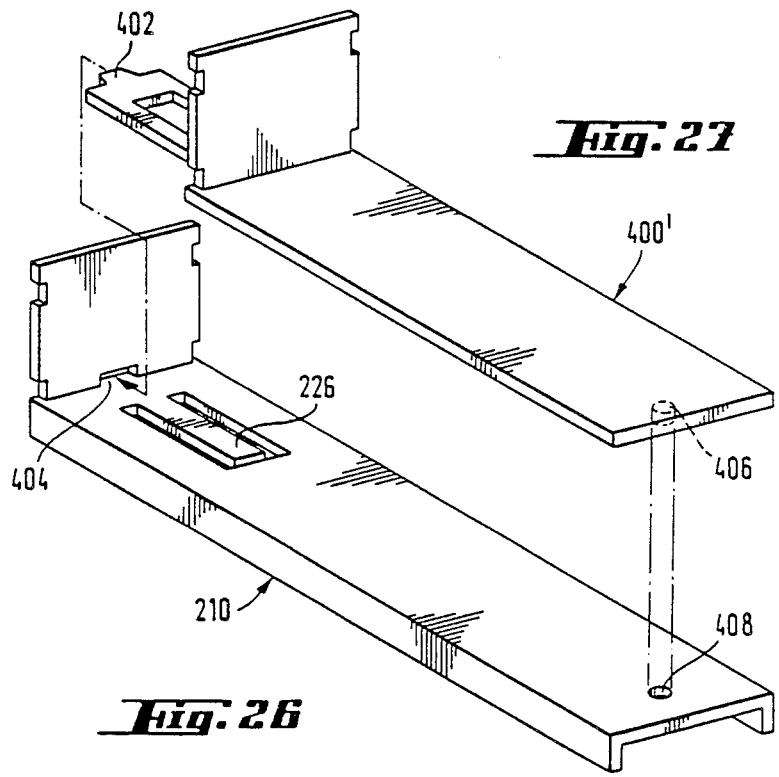

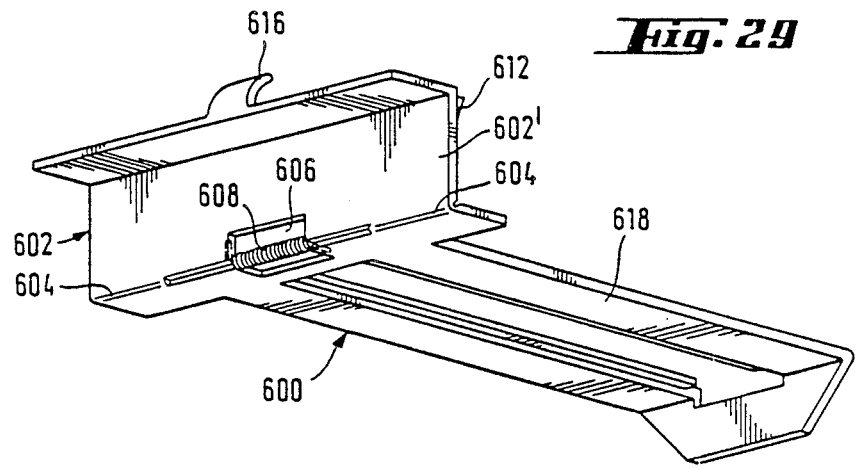
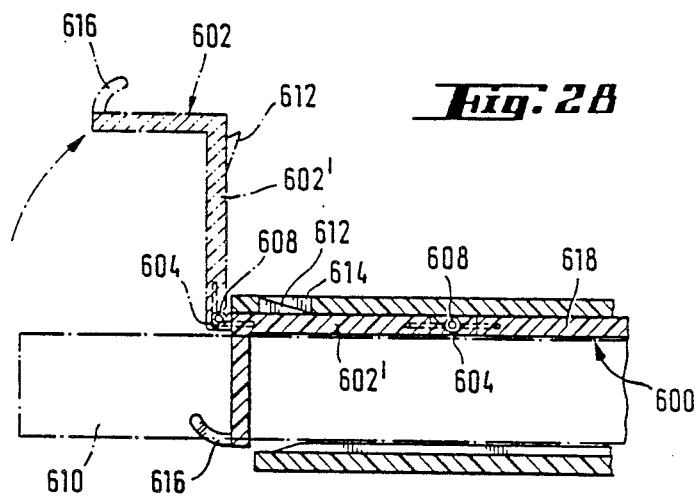

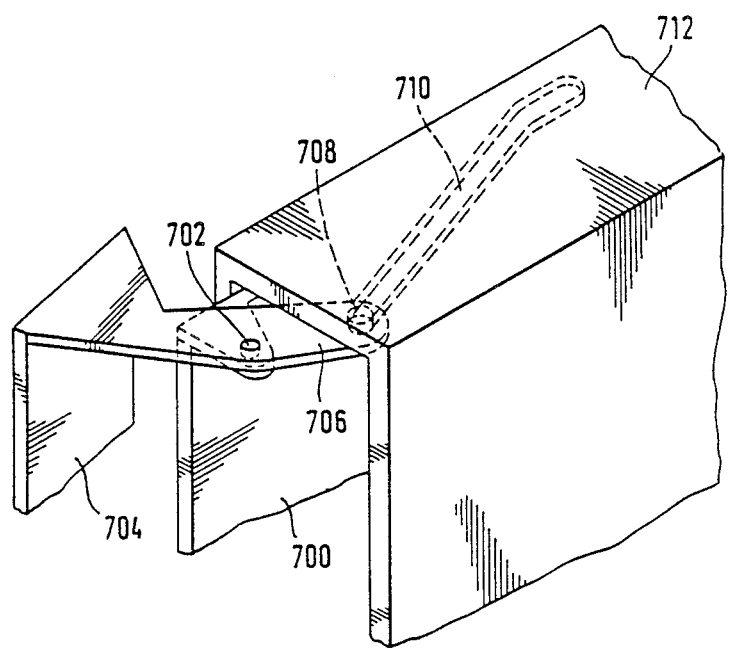

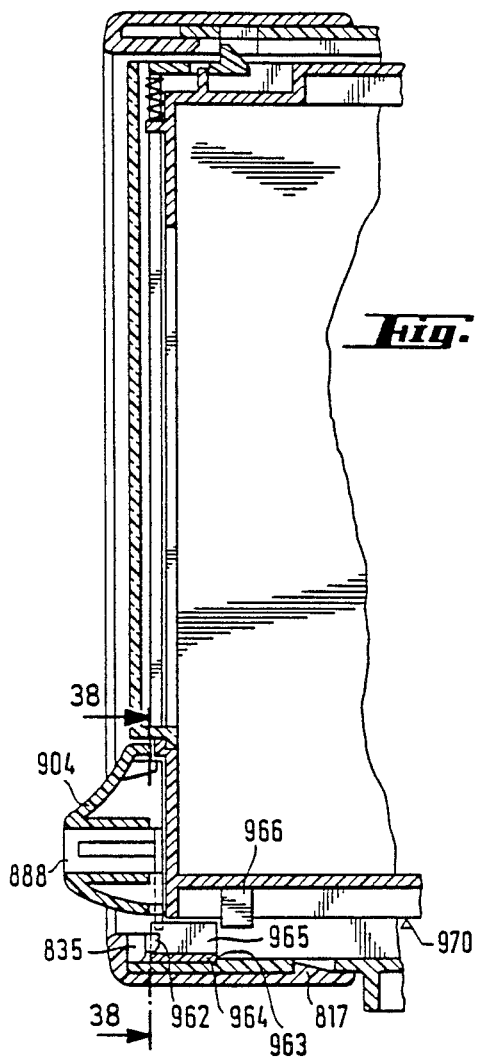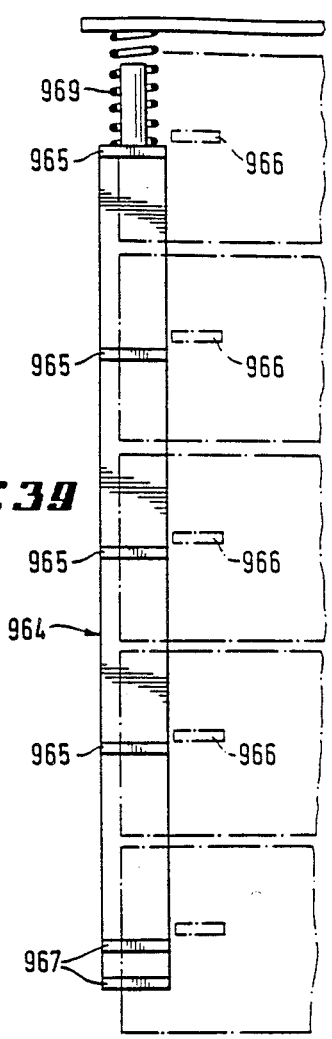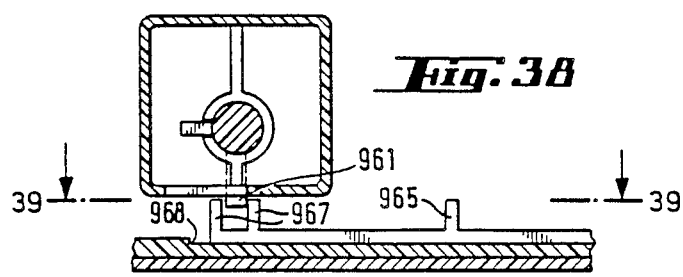

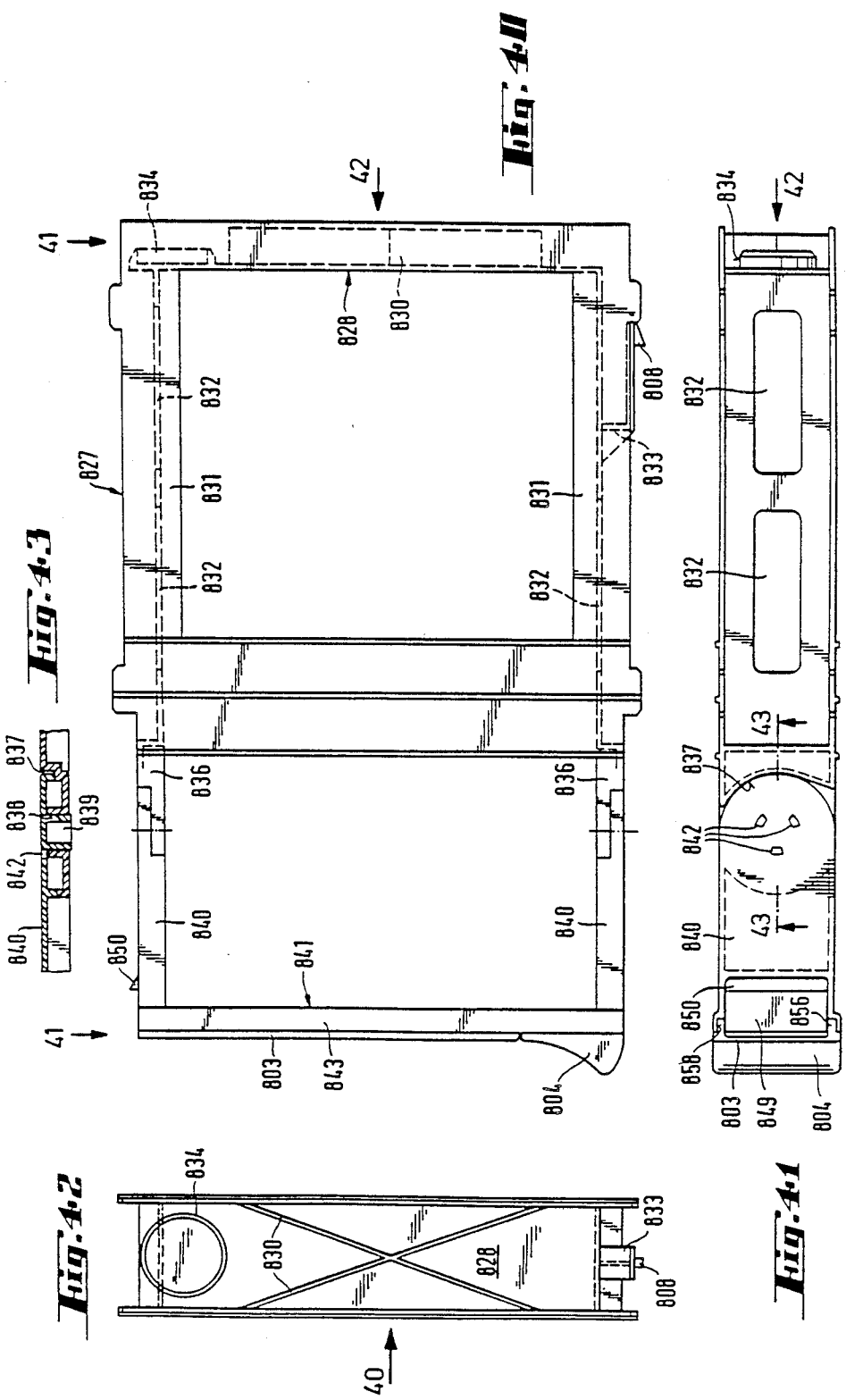

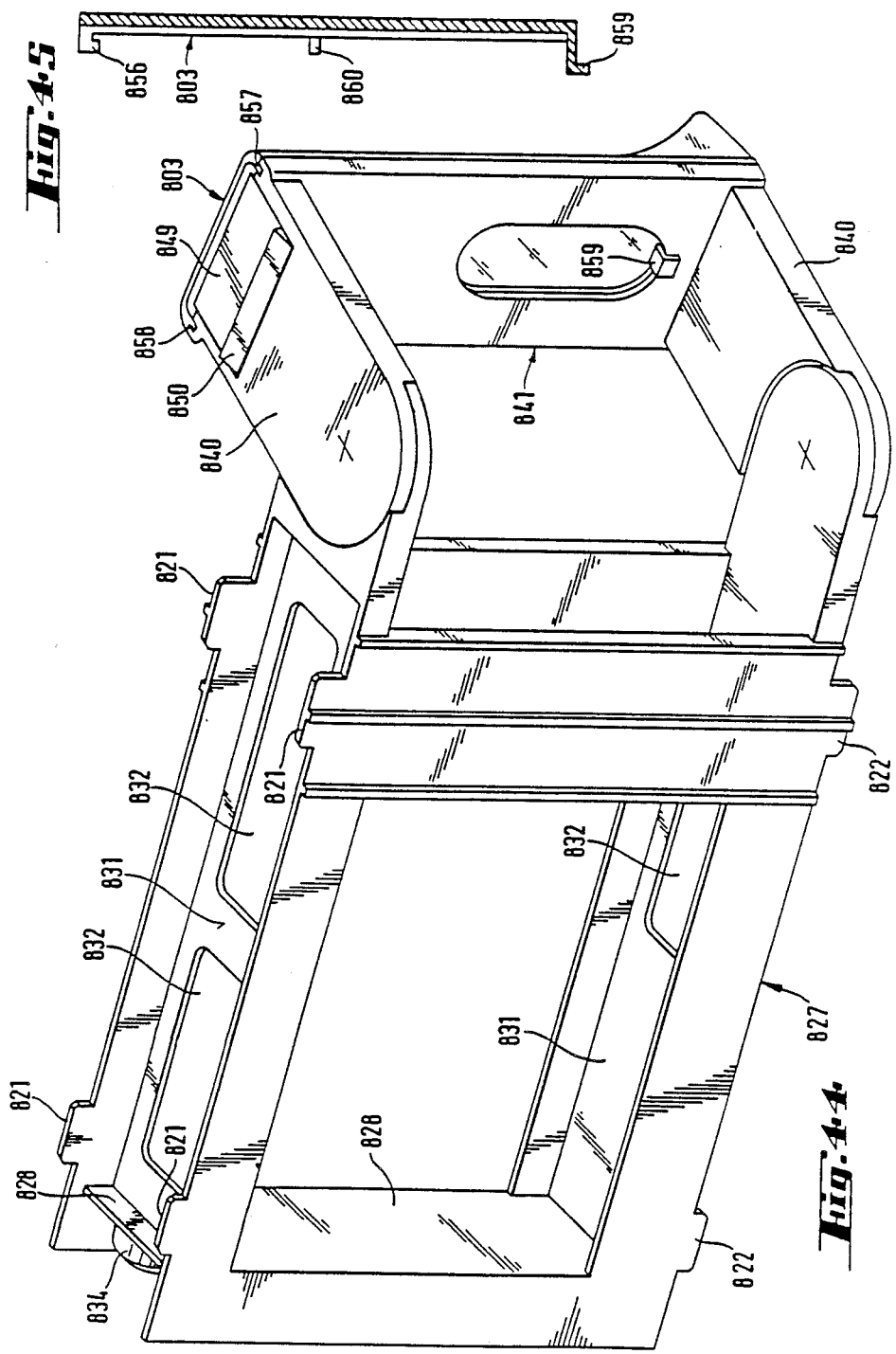

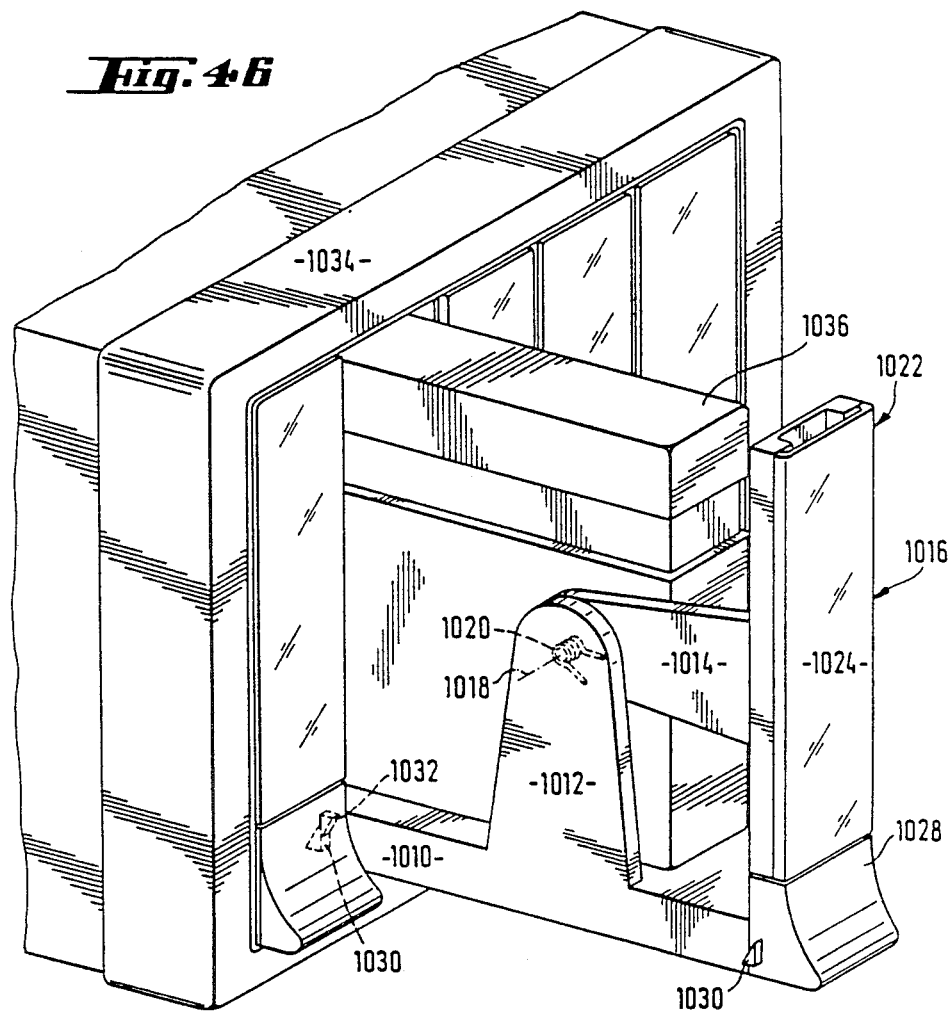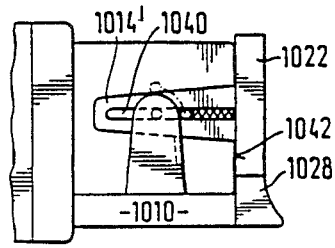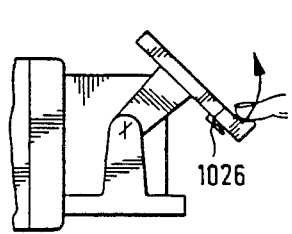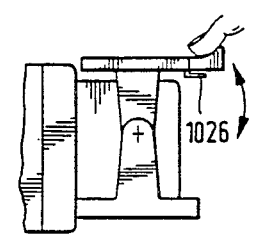

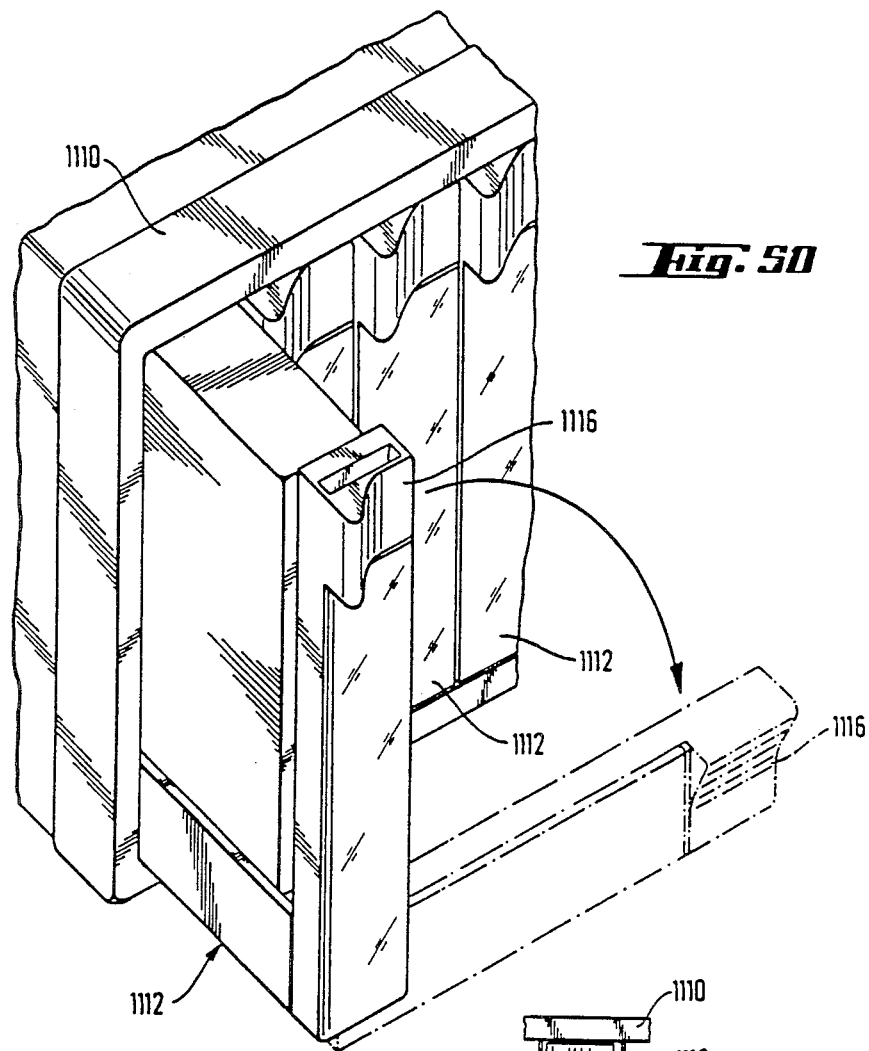
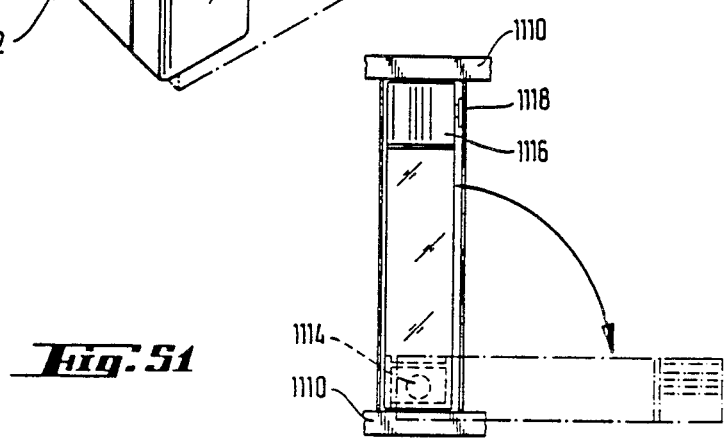

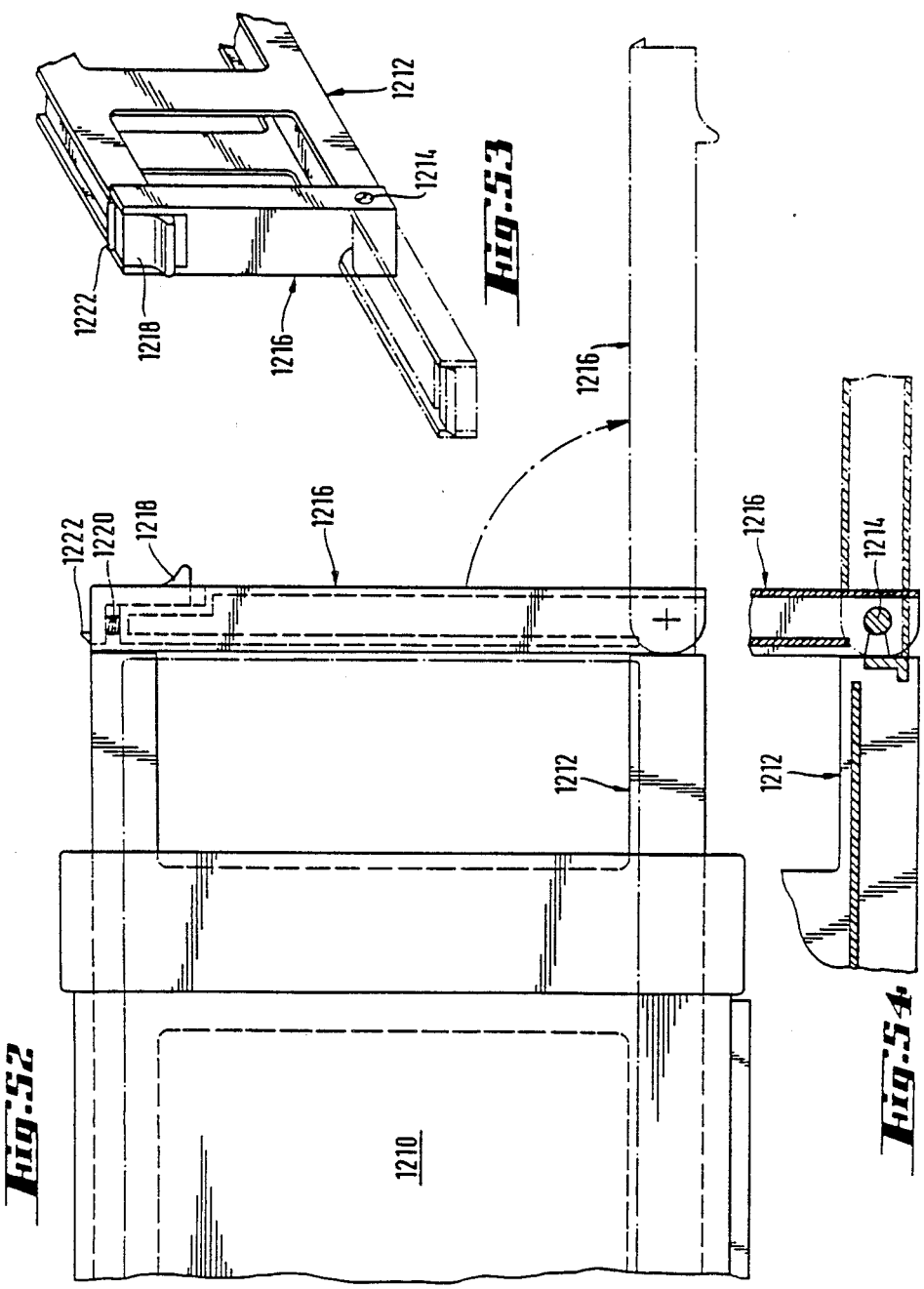

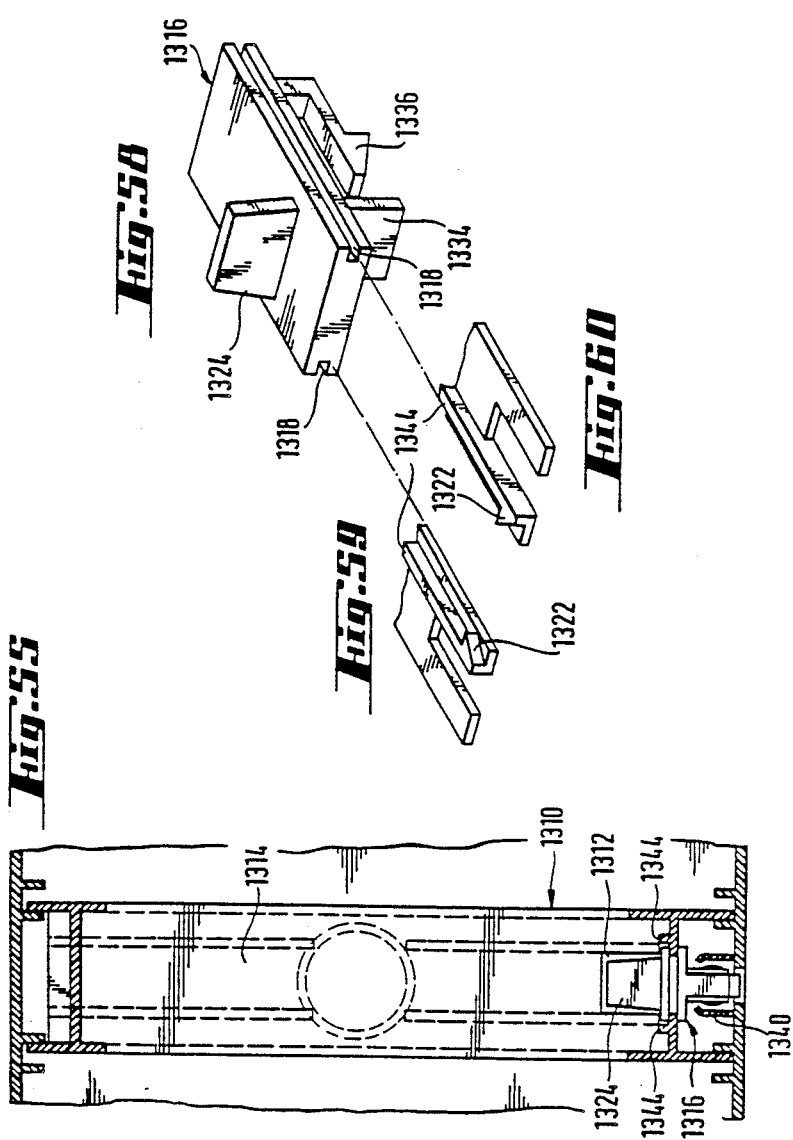

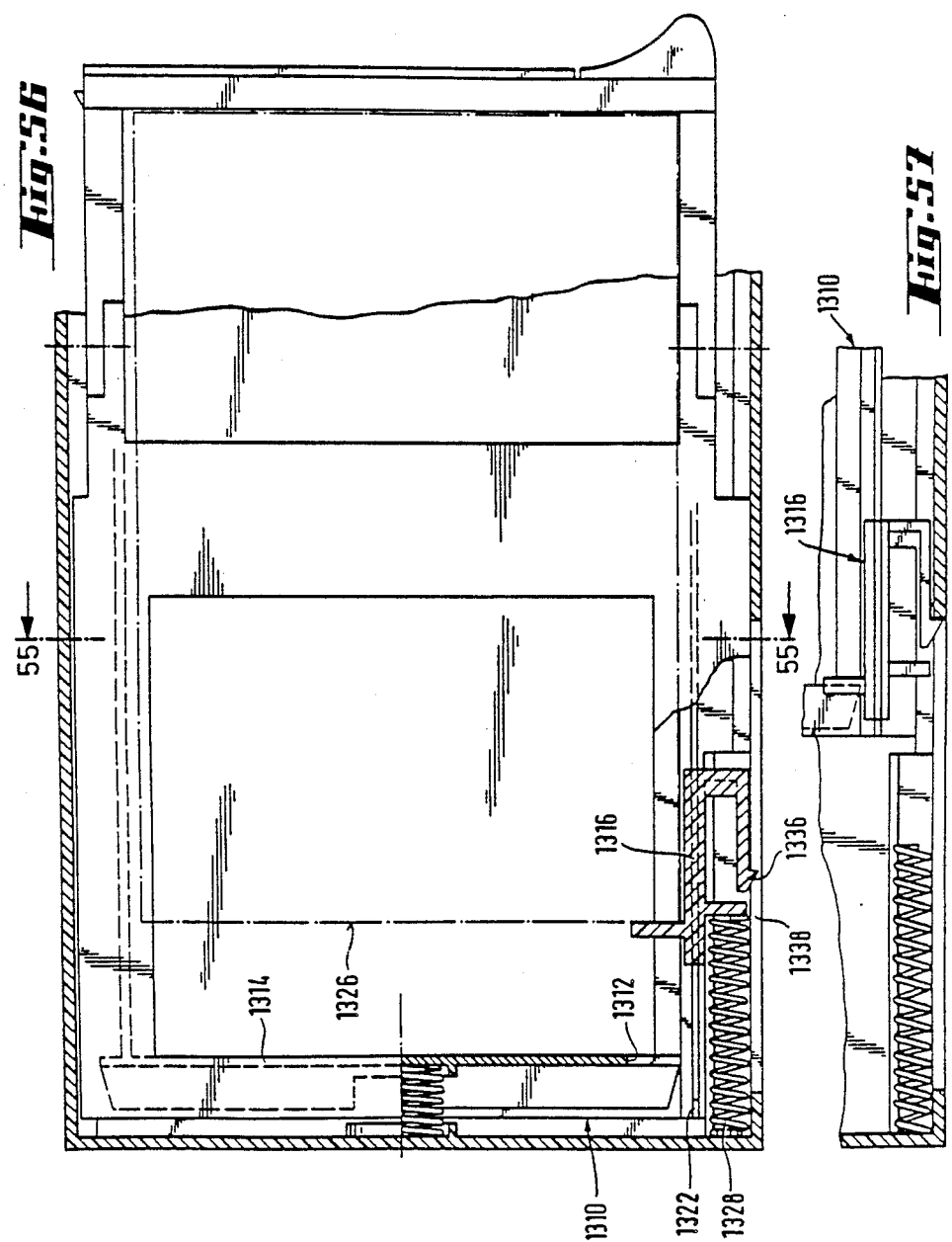

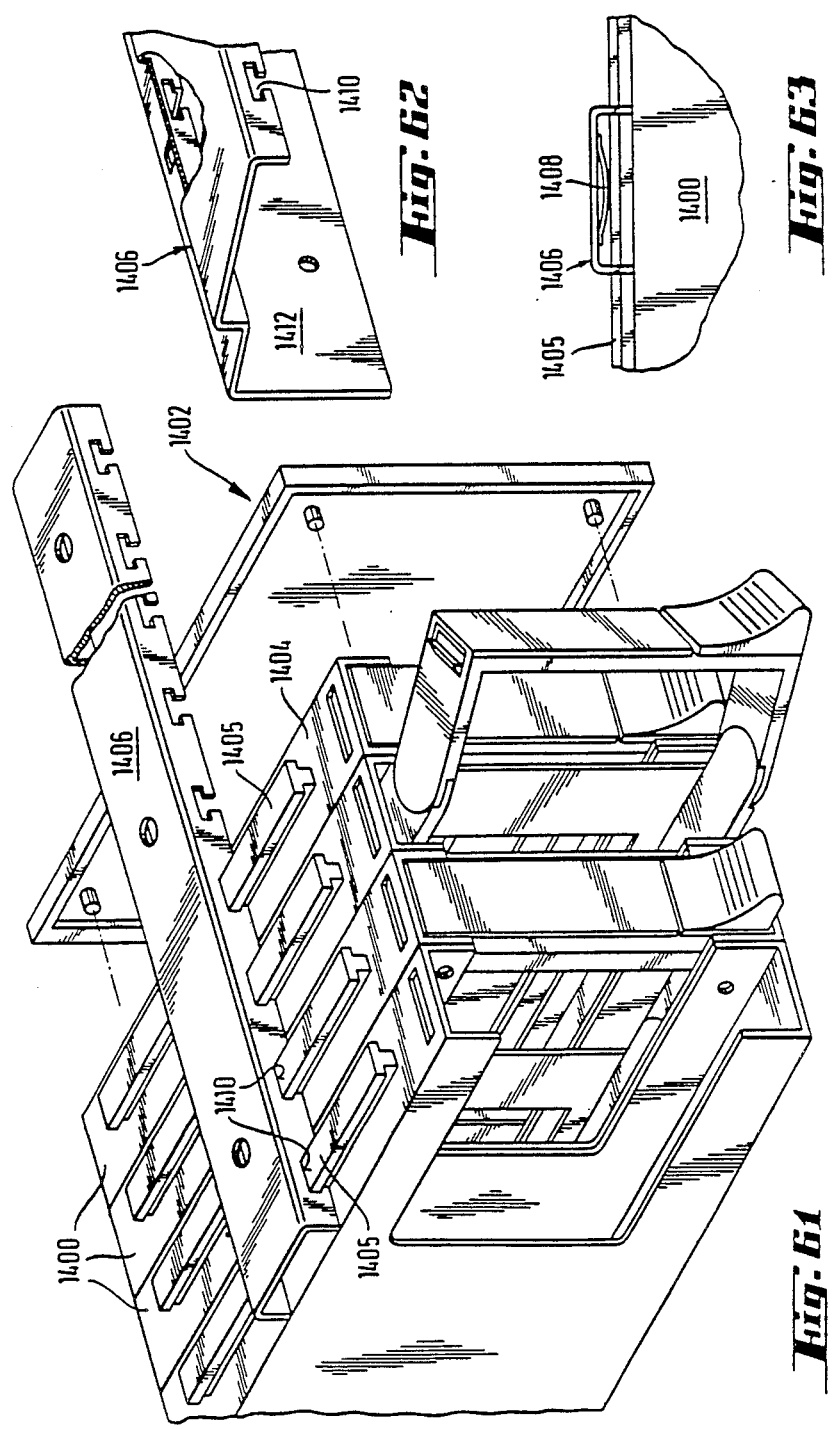

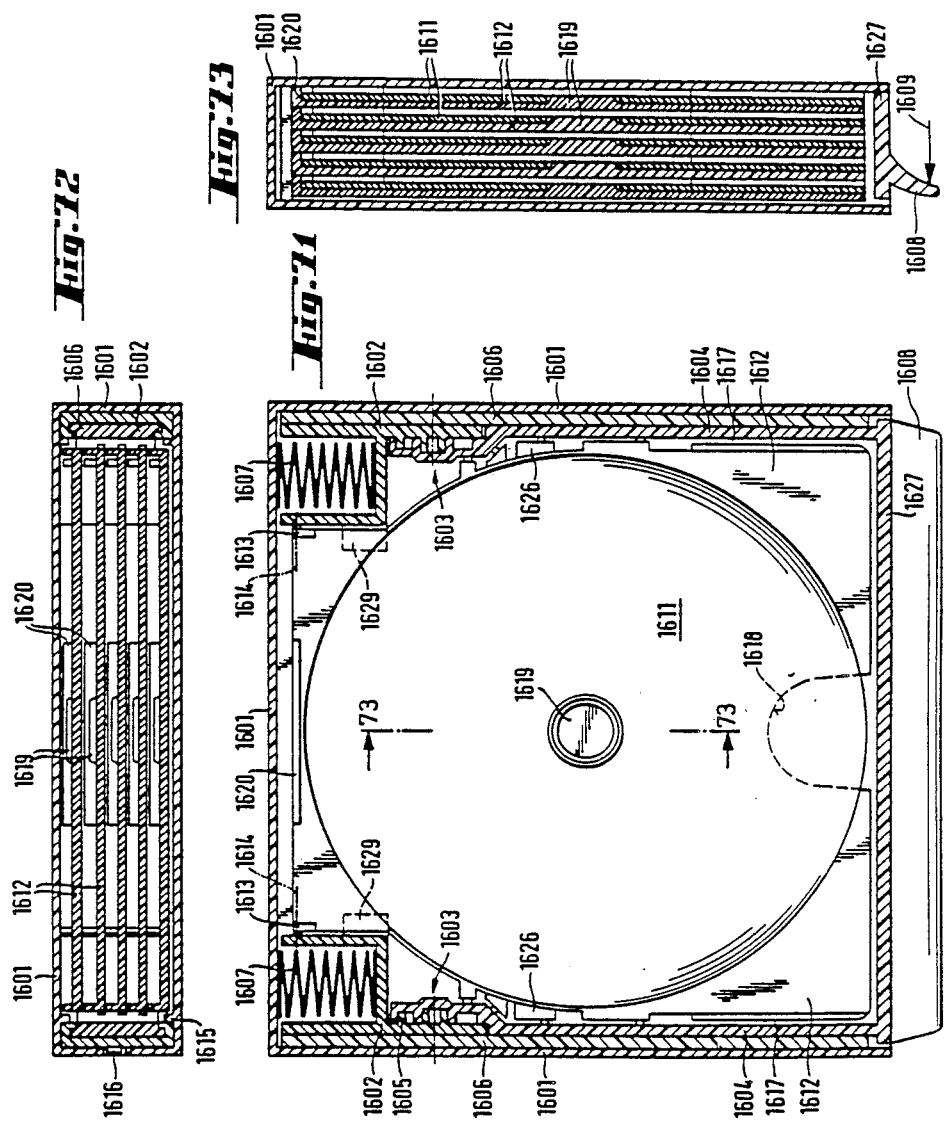

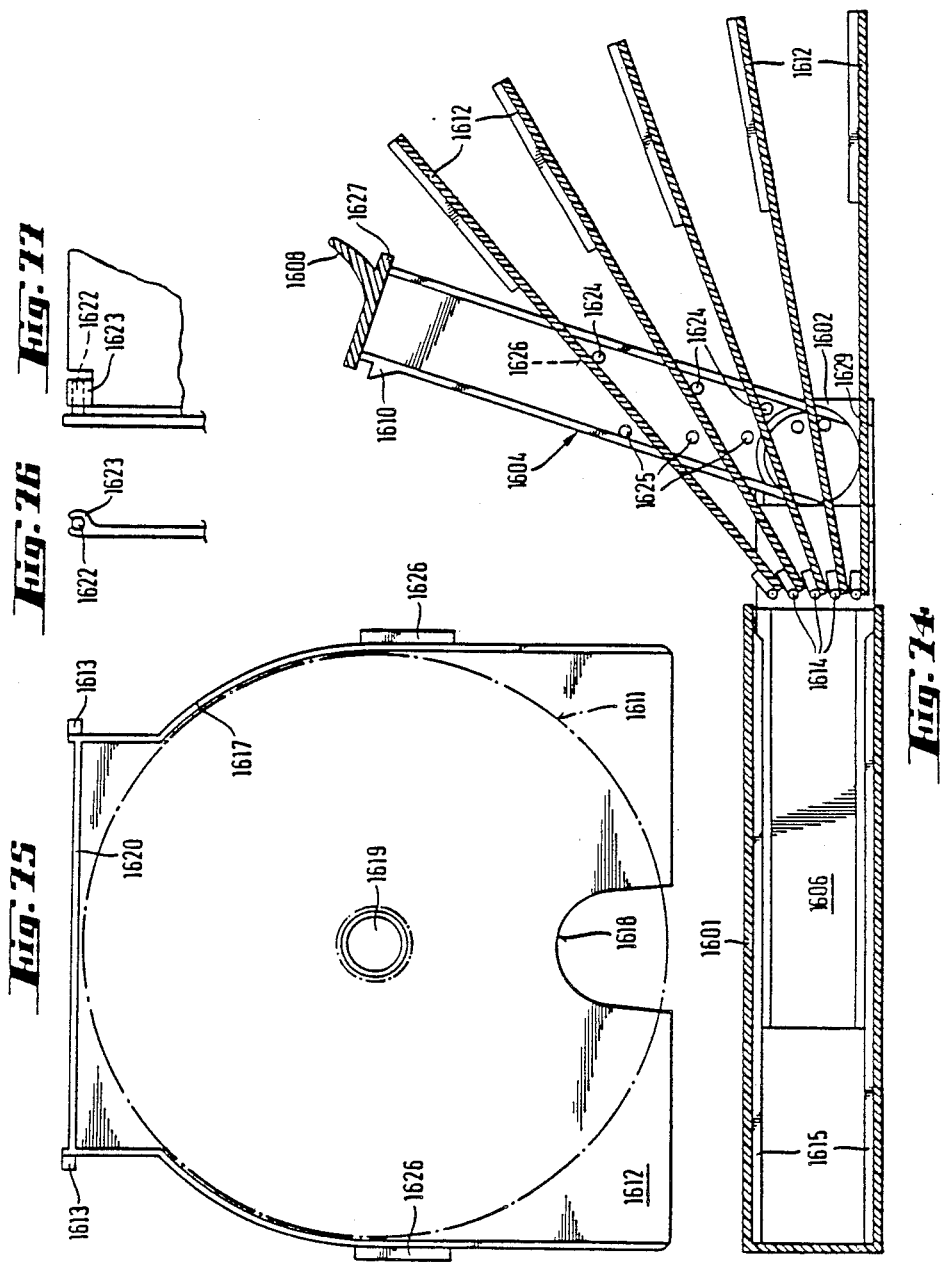

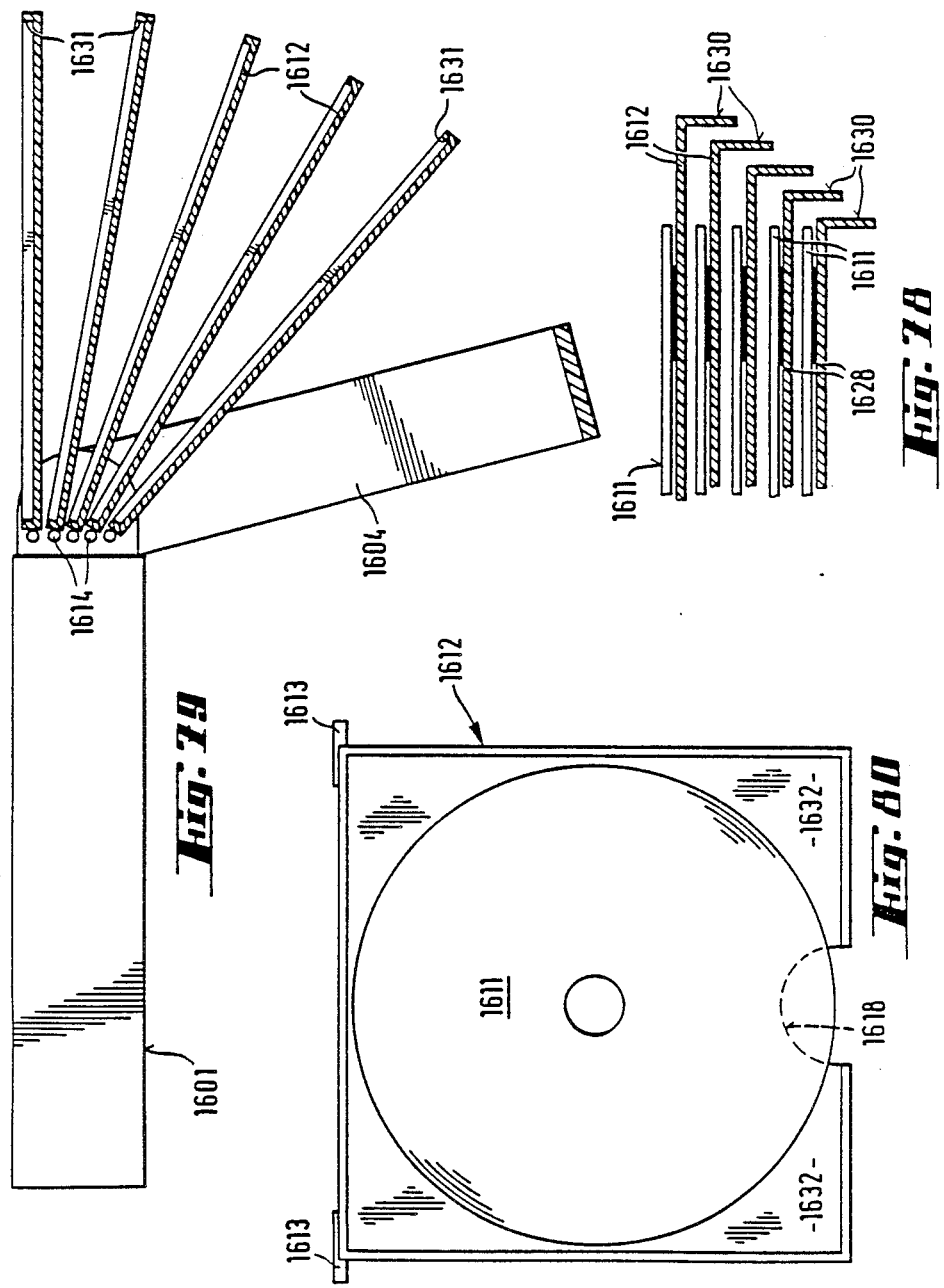

CONTAINER FOR THE STORAGE OF MAGNETIC-TAPE CASSETTES OF OTHER RECORDING MEDIA

This is a divisional of co-pending application Ser. No. 735,293 filed on May 17, 1985, now abandoned, which is a continuation of application Ser. No. 456,392 filed on Jan. 7, 1983, now abandoned.

The invention relates to a container for the storage of recording media. A large number of such containers are known for conventional sound-tape and compact cassettes, and attention is drawn, here, to the following publications: German Patent Specification No. 2,248,408 and German Patent Specification No. 2,521,371.

The known containers have the features mentioned in the pre-characterizing clause of patent claim 1.

In addition to the conventional sound-tape cassettes, there is increasingly widespread use of magnetic-tape cassettes which are intended and are suitable for the recording of video and audio signals and which will be designated below as video cassettes. No design has yet received definitive acceptance for such cassettes, and apart from their generally rectangular basic form they differ considerably from one another, even as regards their dimensions. A feature common to them is, of course, that even more than compact cassettes they are sensitive to rough treatment and dust. There is therefore a need for an appropriate storage container. As is basically true of storage systems, there is, here also, the requirement that the container itself should take up as little space as possible, should be economical to produce and should have, if possible, a modular design, that is to say containers identical to one another should be combined with one another into filing systems. A further requirement is that such a filing system should utilize a given space as efficiently as possible, the depth of conventional shelves largely corresponding to the greatest longitudinal dimension of video cassettes. Finally, it almost goes without saying that it should be simple and convenient for the user to handle the containers, that is to say to extract and insert the cassettes; because of the considerably larger dimensions of video cassettes in comparison with compact cassettes, this means, among other things, that it should be possible to grasp the cassette on its wide sides.

Many households have, in addition to video recorders, also sound playback sets, and a great future may be expected especially for the so-called "compact disks" or compact phonographic disks because of their considerably more favorable properties in comparison with conventional disks or cassettes. There is the problem of accommodation and handling even for these media or recording media, and since the two recording media discussed especially here will probably be present not as an alternative, but in addition to one another, it would be desirable to have containers available which, whilst having an outwardly identical shape, can be adapted selectively to one recording-medium system or the other.

The object of the invention is to provide a container for magnetic-tape cassettes, compact phonographic disks and, if appropriate, further recording media, which takes the above requirements into account.

The features envisaged, according to the invention, for achieving this object are mentioned in the characterizing clause of patent claim 1.

A container having the following advantages is produced as a result:

In contrast to the two known containers, in the embodiment according to the invention the cassette does not need to be lifted over the front plate of the slide during insertion or extraction; this would mean, particularly as regards the relatively large dimensions of video cassettes, that either the containers would have to be thicker than necessary from the point of view of the actual space requirement of the cassette, or the slide would have to be moved so far out of the housing that stability would no longer be guaranteed. Nevertheless, sufficient dust protection is provided, however, by the preferably pivotable cover which is formed by the front wall. The cassette can be grasped on its wide sides, this being favorable in ergonomic terms, and several containers can be assembled into a filing system in such a way that the cassettes are either horizontal or vertical. At the same time, it is especially important for the straight guidance of the slide to be maintained; it is therefore guided cleanly over its entire stroke, so that the risk of jamming is minimal, even when the parts sliding on one another consist of plastic, this being preferred for reasons of cost.

However, such a container is also suitable for compact phonographic disks which can be stacked in a narrow space, but can nevertheless be readily accessible for extraction, especially when, and this is preferred, the previously closely packed disks are fanned open after the container has been opened and the slide pushed out.

The front plate can be articulated to the slide.

The front plate can be pivotable about an axis parallel to the longer side of the housing orifice.

When the slide is locked, the axis can be arranged offset from the housing orifice into the housing interior.

The axis can be arranged offset laterally relative to the plane of symmetry of the housing.

The axis can be located in the plane of symmetry of the housing.

At least one pivot joint can be provided.

An articulation resembling a joint hinge can be provided.

The slide can have plate parts in the region of the joint, parallel to the narrow housing walls which start from the housing orifice.

The slide can have, parallel to the two narrow housing walls, plate parts each with a joint.

The slide can be frame-shaped so that the plate parts extend essentially over the depth of the housing and are connected by a transverse plate near to the housing rear wall located opposite the housing orifice.

The slide can have a longitudinal leg guided parallel to a narrow side of the housing, and at the end facing away from the housing orifice a transverse leg can adjoin this longitudinal leg in the form of a capital L.

The front plate can be articulated on one side to the longitudinal leg.

The longitudinal leg can be connected, by means of a plate extending parallel to the wide side of the housing, to a further plate part, parallel to the other narrow side of the housing, a second joint being located on this further plate part.

The slide can have a base plate guided on a wide side of the housing.

The joint can be formed in the plane of the base plate of the slide.

The plate parts can be made in one piece with the base plate.

The front plate can be articulated to one edge of the slide, which, when the slide is blocked, is approximately flush with the housing orifice.

Angled plate parts articulated to the slide can adjoin the front plate.

The front plate can form with one plate part an approximately L-shaped sub-assembly.

The front plate can form together with two plate parts an approximately U-shaped sub-assembly.

The front plate can have an angled bottom piece which, when the slide is locked, is approximately aligned with the base plate of the latter.

Positive locking can be provided between the housing, on the one hand, and the movable parts consisting of the slide and front-plate sub-assembly, on the other hand.

The housing can have a first locking member and the front-plate sub-assembly can have a second locking member interacting with the first.

The front plate can be designed as an unlocking member.

The lock can be unlockable as a result of the movement of the front plate in a direction opposite its releasing movement.

One of the locking members can be a hook and the other can be an orifice into which the hook can drop.

The slide, on the one hand, and the housing, on the other hand, can each have a locking member, and an unlocking member can be provided, next to the front plate, in the housing orifice.

The unlocking member can be a prolongation of the slide.

The slide, on the one hand, and the housing, on the other hand, can each have a locking member formed by a slot link and an elastic sliding block.

The sliding block can be molded to the housing and the slot link shaped on the slide.

The front plate can be prestressed into its cassette-release position by a spring.

A spring acting between the slide and the front plate can be provided.

The prestressing spring can be a necked hinge spring.

The prestressing force of the ejector spring can be transmitted to the front plate via guide elements.

At the same time, there can be a guide in the form of a pin guided in a groove.

The releasing movement of the front plate can be limited by stops.

The front plate can be guided automatically into its closing position when the slide is pushed into the housing.

The front plate can be guided automatically into its release position when the slide is moved.

For the movement of the front plate, there can be in the housing a slot guide into which engages a sliding block provided on the front-plate sub-assembly.

A projecting actuating button can be attached to the front wall.

The front wall can be designed as a label carrier.

The front wall can have a transparent window covering a label.

The front wall can consist of transparent material.

The container can have inner dimensions adapted to the largest cassettes, and there can be compensating elements for supporting cassettes of smaller dimensions.

At the same time, adaptors which can be attached to the slide can be provided.

At the same time, there can be a leaf spring fitted in the housing, with an angled stop which can be pivoted away as a result of deflection of the leaf spring when larger cassettes are pushed in.

At the same time, a braking element acting on an inserted cassette can be provided.

The leaf spring can be designed, at the same time, as a braking element.

Each slide can have its own housing which can be connected positively to at least one further identical housing.

The housing walls adjoining the front orifice of the housing can be provided with connecting elements.

There can be for several cassettes a common housing which has a slide for each cassette.

The housing can consist of an outer frame and inserted intermediate trays.

The housing can have guide ribs for the longitudinal leg of the slide and spacer ribs for the cassettes on the housing wall located opposite the longitudinal leg.

The housing can comprise a plastic injection-molding.

The slide can comprise a plastic injection-molding.

The front plate can comprise a plastic injection-molding.

The slide and the front plate can form a one-piece plastic injection-molding with a joint injection-molded on.

The plate parts can bend elastically outwards in relation to the slide in order to fit the front-plate sub-assembly on the slide.

Bearing sleeves or bearing brushes which can snap into one another can be formed on the plate parts of the slide, on the one hand, and on the front-plate sub-assembly, on the other hand.

The body of a necked hinge spring, the legs of which engage into slits in the plate parts, can be accommodated in the interior of the bearing sleeve.

The housing can have guide ribs for the longitudinal leg of the slide.

Outside the guide region, the housing can have, for the longitudinal legs, supporting ribs for inserted cassettes.

The slide can be stiffened on its transverse plate by attached ribs which are molded to the rear side of the said plate which faces away from the housing orifice.

The braking element can be a foam article fastened in the housing interior.

When the housing is designed to receive several cassettes, the front plates can be designed to overlap one another in their closing position.

The housing can have guide ribs connected operatively to guide runners of the slides.

The slide can be made frame-shaped with H-profile struts which are parallel to the guide ribs and carry the guide runners, a cassette fitting in between the channels facing one another, with an end wall on which the ejector spring engages, and with intermediate struts connecting the H-profile struts to one another on their side facing away from the end wall.

The cross bars of the H-profiles can be prolonged beyond the intermediate struts and can each have a bearing lug for bearing arms of the front plate.

A release button and a label-receiving compartment can be arranged above one another on the outside of the front plate facing away fron the container interior.

The release button can be connected, via a connecting rod guided along the front plate, to a detent hook which can engage into a housing orifice under spring prestress.

The housing can have, at the front, a frame-shaped housing collar.

The housing collar can be injection-molded from plastic as a separate component and can be fitted to the housing by a snap connection.

A lock can be installed in at least one button of all the slides accommodated in the housing.

A lock connected operatively via a blocking member to all the slides can be installed in only one slide button of all the slides accommodated in the housing.

The blocking member can comprise a plate which is movable transversely to the direction of movement of the slide from a release position into a blocking position by means of the lock and which has blocking prongs which, in the blocking position, are located in front of opposing prongs on the slides and which are preferably spring-prestressed in the release position.

The lock can comprise a blocking arm which, in a blocking position, blocks the button shift.

Large-area sections of the slide can have weight-reducing perforations.

The top side of the housing can be made dimensionally complementary to its underside, so that several identical containers can be stacked positively above one another.

A raised housing-collar edge can be made complementary to an opposing edge of a housing foot.

The housing foot can be designed as a guide for a drawer.

The front plate can be articulated to the slide in such a way that it is pivotable about an axis extending in the direction of the shortest dimension of the stored article.

At the same time, in addition to the pivotable connection between the front plate and the slide, there can also be translatory displaceability between the two.

The front plate can be connected to the slide so as to be pivotable about an axis parallel to the direction of translation of the slide and extending near to a housing wall.

Furthermore, the slide can have a bottom slide for adapting the receiving space within the container to different sizes of the article to be stored.

Moreover, positive-locking elements can be provided on the housings, and by means of these they can be anchored to a common supporting member so as to build up a tape library.

For the storage of compact phonographic disks, the slide can have receiving orifices each for one of several phonographic disks accommodated in a common slide. At the same time, it can be appropriate to arrange the receiving orifices in such a way that the compact phonographic disks are retained in the receptacles under the effect of gravity. At the same time, the phonographic disks can be accommodated so as to move aside in a direction away from the housing orifice for the purpose of the extraction of an individual disk.

However, it can also be appropriate to assign to each of several compact phonographic disks accommodated in a common slide a particular holder which, together with the slide, can be moved translationally out of the housing, and to spread these individual holders apart from one another for the purpose of better access.

At the same time, it can be appropriate for this spreading open or fanning open to be positively controlled by the outward movement of the slide or to take place under spring force.

Exemplary embodiments of the subject of the invention are explained in more detail below with reference to the attached drawings in which:

FIG. 1 illustrates, in a diagrammatic longitudinal section, a first container in the closed state, FIG. 2 shows the container in a similar representation, but opened, FIG. 3 shows an exploded representation of the container in perspective, parts being cut away, FIG. 4 shows the position of components to be assembled, immediately before assembly, in a diagrammatic sectional representation, FIG. 5 corresponds to FIG. 4, but shows a side view, FIG. 6 shows, in a rear view, several containers stacked into a block, FIG. 7 shows, in a plan view, an edge region of one of the stacked containers, FIG. 8 shows, in a view from below, the associated engagement element of the next container, FIG. 9 illustrates, in section, a detail of the engagement elements, FIG. 10 shows, in a view from the front, a container housing according to the invention, in which several cassettes can be accommodated, FIG. 11 shows an enlarged representation of the region marked by "11" in FIG. 10, FIG. 12 shows a partial section along the line 12—12 in FIG. 10, FIG. 13 shows a sectional representation along the line 13—13 of FIG. 10, although in the middle compartment the spring and in the compartment second from the top the slide have been omitted, FIG. 14 shows a vertical section through a further embodiment of a container, FIG. 15 shows the associated horizontal section, FIG. 16 shows the associated front view, the cover being omitted, FIG. 17 shows an alternative form of the cover from the front, FIG. 18 shows the associated side view, FIGS. 17a and 18a show a further form similar to FIGS. 17 and 18 respectively, FIG. 19 shows a front view of a collective block for several cassettes, three compartments being shown with a cover, one compartment being shown with an ejector spring, one compartment being shown with a slide and one compartment being shown empty, FIG. 20 shows a partial sectional representation through several compartments in the front region to illustrate the cover arrangement, FIGS. 21 to 24 are sectional or partial sectional representations of a further embodiment, FIGS. 25 and 26 and 27 show insertion parts for the first and second embodiment respectively for adaptation to smaller outer dimensions of cassettes, FIG. 28 illustrates, in section, a further embodiment of a container, the rear part being cut away, FIG. 29 shows in perspective, from below, the slide for the embodiment according to FIG. 28, and FIG. 30 illustrates, in perspective, a positive guide for opening and closing a container cover, FIGS. 31 to 45 relate to a preferred exemplary embodiment, FIGS. 46 to 49 relate to a further embodiment, FIGS. 50 and 51 show a further embodiment, FIGS. 52 to 54 illustrate a further embodiment, FIGS. 55 to 60 show another design of a container for adaptation to cassettes of different sizes, FIGS. 61 to 63 illustrate diagrammatically a tape library, FIGS. 64 to 70 relate to containers for receiving disk-shaped recording media, especially so-called "compact disks" and FIGS. 71 to 80 show an alternative container design for flat disk-shaped recording media, above all for so-called compact disks.

Video cassette containers will be dealt with first.

FIGS. 1 to 13 relate to a first design of the container. FIG. 1 shows a substantially block-shaped housing 30 with a bottom 32, a covering wall 34, a rear wall 36 and side walls 38. A transport slide 40 is received so as to move by sliding in the housing. It may be seen in FIG. 3 that molded to the housing bottom 32 are guide webs 42 along which extend guide ribs 44 molded to the slide. Supported on the housing rear wall 36, on the one hand, and on a rear plate 46 of the slide, on the other hand, is an ejector spring 48 which is designed here as a helical spring. It rests on studs 50 molded to the housing rear wall 36 and, during ejection of the slide, is secured against buckling out by supporting rails 52 molded to the covering and bottom walls of the housing. Also guided on the supporting rails located on the bottom is the front region of the slide, the base plate 54 of which is provided for this purpose with incisions 56. On the underside of the slide base plate 54 there are two nose-shaped stops 58 which run in slits 60 in the housing bottom 32 and which limit the ejection movement of the slide when they run on to the end edge 62 of the slit.

Over most of its extension in the direction of ejection, the slide base plate is narrower than the interior of the housing, but widens towards the housing front by the amount of two wings 64, on the outer edges of which cheeks 66 extend upwards. Molded to each of the cheeks is a hollow-cylindrical sleeve 68, and a short straight slit 70 and a slit 72 in the form of a circular arc, centered on the axis of the sleeve 68, are made in the cheek. The depth of the slits can be taken from FIG. 4.

The outer wall of the sleeve 68 forms the bearing journal for the cover 74, whilst at the same time it receives a necked hinge spring 68, one leg of which engages into the slit 70. The cover possesses bearing bushes 78 complementary to the sleeves 68, with a further slit 80 projecting away, for receiving the other spring leg.

During assembly, the arms 82 of the cover having essentially a U-shaped contour are spread apart from one another, so that the bearing bushes 78 can snap over the sleeves 68. At the same time, the necked hinge spring 78 previously inserted into the sleeve, is centered by the journal 84 in the center of the bearing bushes. This position is shown in FIG. 5. When the cover is pivoted counter to the direction of the arrow 86 in FIG. 2, the stop pin 88 snaps into the slit 72, and at the same time the necked hinge spring receives the necessary prestrress, that is to say into the position of the cover shown by dot-and-dash lines in FIG. 2.

The base part of the cover 74 incorporates a gripping strip 90 which projects further forwards in relation to a front plate 92, so that a step 94 is formed. Supported on this is a transparent protective plate 96 for a label (not shown), during welding on or gluing on, and it is made easier to extract the label by means of a cut-out 98 in the front plate 92.

The arms 82 of the cover have hooks 100 which, when the slide is pushed into the housing, slide along under the housing covering wall 34, until the slide has reached its inner end position. At the same time, the user presses the entire slide sub-assembly inwards against the prestress of the ejector spring 48. To extract the cassette, the gripping strip is pressed downwards, arrow 102 in FIG. 1, the hooks 100 being lifted out of the perforations 104 which extend through the covering wall 34 of the housing and into which they had engaged, during closing of the housing, under the effect of the necked hinge spring 76. So that the cassette is not catapulted out when the user releases the gripping strip immediately after pressing it down, a brake block 106 made of foam material is provided. Otherwise, the housing, the slide, the cover and the protective plate consist of plastic.

FIG. 6 shows an example in a rear view of how several such containers can be stacked into a vertical block as a result of the provision of stacking rails 108 and stacking grooves 110 on the bottom and covering walls 36 and 34 respectively of the housing. Appropriate elements 108' and 110' respectively can also be provided laterally. These elements do not project completely up to the front face (see FIG. 8), specifically for esthetic reasons. Pushing together during stacking is made easier by the widened portion 112 of the grooves 110, and retention is ensured by means of the locking projections 114 which snap elastically into a depression 116.

It is also possible, however, as emerges from FIGS. 10 to 13, to accommodate several slides according to FIGS. 1 to 5 in a common housing. This consists of an outer frame 120, the bottom 32' and covering wall 34' of which correspond to the embodiment according to FIGS. 1 to 3. Molded to the side walls 122 of the frame 120 are U-shaped retaining devices 124 into each of which an intermediate plate 126 can be inserted. The intermediate plates correspond on their top side to the bottom and on their underside to the covering wall in FIGS. 1 to 3. The outer frame is provided on its front face with inwardly springing edges 128, against which the intermediate plates come to rest when an end wall 130 is attached to the rear side of the frame 120 and fastened there, and the spring-retaining studs 50' can, in this case, also be formed on this end wall.

The advantage of the embodiments described is that sliding guidance can be provided for the slide in its central region, with the result that the risk of jamming as a result of an oblique position (for example, uneven pressure on the grip) is reduced. However, counter-elements of the guide must then also be provided in the central region, and this makes injection molding of a block housing in one piece difficult.

The embodiment according to FIGS. 14 to 20 does not have these features, and it can therefore be produced more economically.

FIGS. 14 to 16 show an individual container. The housing 200 has, here also, a covering wall 202, a bottom 204, a rear wall 206 and side walls 208. In contrast to the illustration according to FIGS. 1 to 13, here the cassettes are stored not "lying" on their wide side but "standing" on one of their longer narrow sides, so that here the side walls 208 therefore have the largest dimension.

A slide 210 of L-shaped contour is guided in the housing so as to move by sliding. The L-shaped leg 212 of the slide, projecting in the direction of the housing orifice has a cross-section in the form of an upturned U (see FIG. 16), so that it can be supported on the sidewalls 208 and on the bottom 204; furthermore, lateral ribs 214 molded to the side walls 208 of the housing engage over this leg. There presses on the shorter slide leg 216 the ejector spring 218 which is supported on the housing rear wall 206 and is secured against buckling out by further ribs 220 also engaging into cut-outs 222 in the slide leg 216. An inserted cassette rests on the side of the leg 216 facing away from the spring 218. The nose 224 on the slide leg 212 rests on a cut-out, elastically resilient tab 226, so that the slide can be introduced into the housing, after which the nose drops into the slits 228 in the bottom 204 and secures the slide against falling out when it reaches the end of its ejection stroke, because this nose runs onto the end edge 230.

The cover 232 is articulated on the front end of the slide leg 212. The articulation is designed in a similar way to that in the first embodiment, but here the sleeve 234 is cut out to approximately 90 degrees so as to limit the opening angle of the cover, and there is a snap lock between the slide and the cover, denoted by 236. The cover mounted only on one side is stiffened by two ribs 238. The locking hook 240 molded to the cover engages into the housing hole 242 when the container is closed. The arrow 244 indicates where the user must press on the cover to release the lock (see also FIG. 19); release at this point is preferred because of the articulation of the cover on one side. Alternatively, a strut 246 from the leg 212 of the slide up to the covering wall can be pulled up and a second point of articulation 248 provided for the cover in this way, illustrated in FIGS. 17 and 18. This results in an improvement in the resistance to torsion of the cover 232'.

In this embodiment, several receiving compartments can be combined in a common housing in an even simpler way than in FIGS. 10 to 13. This is shown in FIGS. 19 and 20.

As it was possible to infer from the explanation regarding FIGS. 14 to 16, the side walls 208 have functional parts only near to the bottom wall 204, so that in the block housing the rest of the walls can be omitted. There are only separating webs 250 on which the inserted cassettes are supported and which carry thickened portions 252 corresponding to the ribs 220, 214 on the remaining walls 208' on the same side as the bottom. The spring 218, the slide 210 and the cover 232 correspond to those described previously, although the profile of the cover is stepped at 254 (see FIG. 20), so as to leave room for the deflection path for the unlocking operation, but without an objectionable open slit occurring as a result. Labels can be glued on in the region 256 or inserted behind a transparent window.

So that cassettes of smaller outer dimensions can also be accommodated, leaf springs 260 are fastened in all the compartments of the housng or in the interior of an individual container—shown in FIGS. 14 to 16—, for example as a result of the clamping of a thickened end 262, as illustrated. Angled on the free end of the leaf spring is a hook 264 against which a shorter and narrower cassette abuts. On the other hand, a wider cassette, when pushed in, already deflects the leaf spring at its curvature 268, so that the hook becomes ineffective, as shown by broken lines. Moreover, the spring 260 also performs the function of the brake 106 in FIG. 2.

FIGS. 21 to 24a shows a second exemplary embodiment. Here also, the housing 900 is divided into a receiving space for the cassette and a lateral channel, specifically FIG. 22 shows the H-shaped cross-section of the ejector 902 which fills this channel and terminates it at the front with a button 904. As may be seen in FIG. 21, the ejector has on the inside an ejector arm 906, and there extends away from this towards the housing orifice a longitudinal leg 910 which is guided by the lateral H-leg 912. There presses on a second arm, the spring arm 914, the helical compression spring 916 which is secured against buckling out by ribs 918. The cover 920 is articulated pivotably at 922 on the longitudinal leg of the ejector, so that the front face of the housing is closed also in the region of the cassette receiving space.

Molded to the leg 910 of the ejector, on the same side as the channel, is a slot link 924, the profile of which may be seen in FIG. 23. There interacts with the slot link a post 926 which is molded to the housing bottom 928. When, as in the exemplary embodiment illustrated, the housing and the ejector as well as the cover are plastic injection moldings, it is appropriate, as shown, to make in the bottom 928 a perforation 930 through which the appropriate molding die projects during injection-molding. The post 926 has a cross-section with a retaining edge 932 which catches in a complementary notch in the slot link 924 when the ejector is locked in the housing.

To extract an inserted cassette, the button 904 is pressed, as a result of which the slot link is displaced in relation to the post 926. At the same time, its control edge 934 presses the elastically deflectable post 926 away downwards in FIG. 23, until it can jump back again into its position of rest as soon as it is released by the slot link. When the user ceases pressing on the button, the control face 936 presses the post aside again, now in the opposite direction, and the notch-free edge 938 of the slot link slides past the post, so that the ejector transports the cassette outwards with it. During closure, the control edge 940 of the slot link brings the post 926 back into the position shown in FIG. 23.

Together with the cassette, the entire ejector, along with the cover articulated to it, is transported forwards. A spring, preferably a necked hinge spring, is inserted in the joint of the cover so that the cover is prestressed into the open position according to FIG. 24. During closure, the cover runs with its cheek 942 onto the end edge of the housing and is thereby closed, as shown in FIG. 24a by unbroken lines.

What was stated above in relation to the embodiments as regards the stacking of individual housings or the formation of block housings, limitation of the ejection path, etc., can also be applied appropriately to the exemplary embodiment described last.

FIG. 25 shows how an adaptor 400 attached to the slide 40 according to FIGS. 1 to 13 permits adaptation to shorter cassettes. The adaptor 400' is designed in a similar form, and this can be pushed by means of a tongue 402 into a perforation 404 in the shorter L-leg of a slide 210 according to FIGS. 14 to 16 and can be fixed by means of a press-button 406 which engages into a hole 408 provided for this purpose in the slide.

FIGS. 17a and 18a show, in a similar representation to that of FIGS. 17 and 18 respectively, a further exemplary embodiment.

The housing 500 again has an essentially rectangular shape. Supported on its rear wall 502 is the ejector spring 504 which is designed as a helical compression spring and which acts on the transverse leg 506 of the transport slide 508. The transverse leg 506 is narrower than the clear width of the housing, as can be seen clearly in FIG. 17a, and longitudinal legs 510 and 512 respectively adjoin its two ends. These longitudinal legs serve for guiding the slide, and for this purpose guide ribs 514 which engage behind the longitudinal legs are molded to the housing. Because of the narrower design of the transverse leg,, the latter can, when the slide slides out of the housing, slide past these guide ribs and likewise pass the further ribs 516 which secure the spring 504 against buckling out.

In a similar way to FIGS. 17 and 18, the lower longitudinal leg 512 is designed with a U-shaped cross-section, whilst the upper longitudinal leg 510 rests smoothly against the upper convering wall. The reason for this different design is that when a cassette is inserted the pivoted cheek 517 of the cover 518 would interfere at the bottom, whereas this is not the case at the top. However, the longitudinal leg could also be designed in the same way at the top and at the bottom. The nose 524 corresponds in its function to the noses 224 of FIG. 15, the nose 526 on the upper longitudinal leg being, of course, smaller. Locking and unlocking are designed as in FIG. 14. Stiffening ribs 528 reduce the sag of the transverse leg 506 under the effect of the spring 504.

It can be expedient, in the container according to the embodiments described above, to damp the ejection movement of the cassette, for example by providing a piston/cylinder arrangement with throttling of the air flow.

In the embodiment according to FIGS. 28 and 29, the slide 600 and a cover sub-assembly 602 are a one-piece injection-molding, the joint 604 likewise being injection-molded on at the same time. A necked hinge spring 608 is inserted in a cut-out 606 in the central joint region so that the cover sub-assembly 602 is prestressed into the extraction position of the cassette 610 illustrated in FIG. 29 (indicated by broken lines in FIG. 28). The longitudinal plate 602' is locked in recesses in the housing 614 by means of noses 612, and the lock can be released by pressing the button 616. The contrast to the first embodiment described, here there is no base plate to the slide, but the slide is guided by means of a "cover plate" 618 on the top side of the housing. Otherwise, there is essentially conformity between the two exemplary embodiments.

In the Figures described hitherto, the cover has been prestressed into the extraction position of the cassette by means of spring prestress in the region of its joint. FIG. 30 shows that the spring prestress of the ejector or main spring can also indirectly cause the opening of the cover: the cover 704 articulated to the slide 700 at 702 by means of a pin has an extension 706 which projects into the housing interior and to which a pin 708 is molded. This engages into a groove 710 which is cut out in the interior of the housing in the narrow wall 712. In the opening position shown, the end of the groove forms the stop for limiting the swinging-open angle; when the cassette is pushed in, the pin is guided along the groove and pivots the cover again into its closing position. During opening, the operation takes place in reverse. This type of actuation of the cover is especially advantageous when the cover is not at the same time also an unlocking member.

Figure 31:
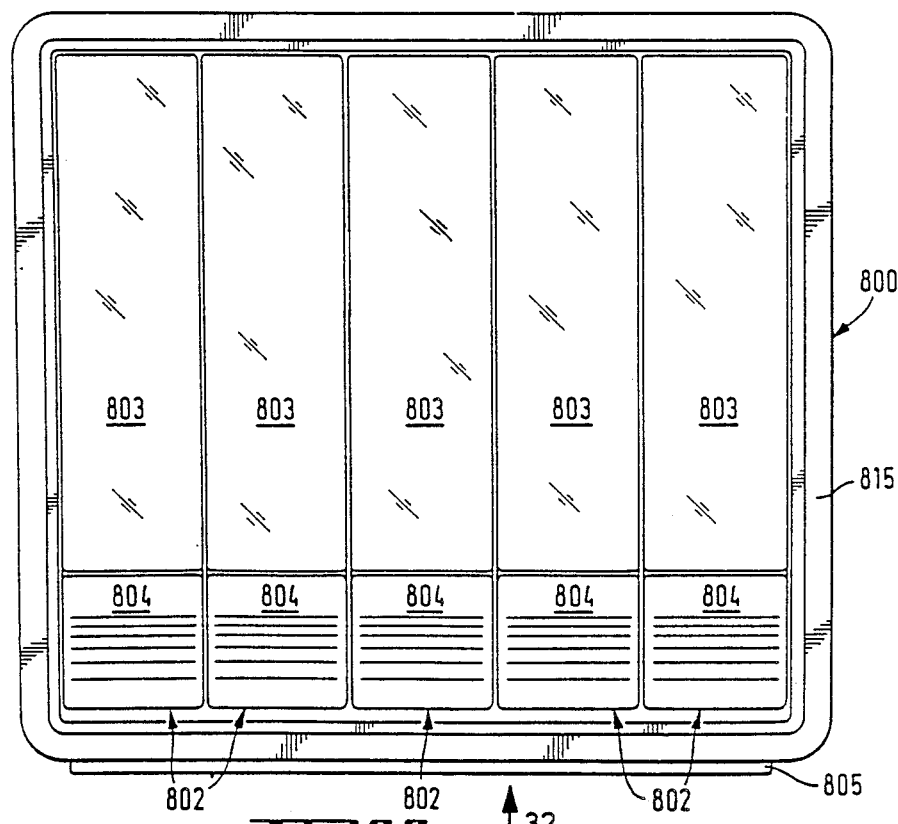

FIGS. 31 and 45 relate to a further embodiment, FIGS. 33 and 37 to 39 representing possible alternative forms.

In this embodiment, five particular cassettes are accommodated in a common container. However, it goes without saying that this number is not mandatory and that a person skilled in the art can easily make the slight changes necessary for other desired numbers. The container is designed so that it can be stacked with further identical containers.

FIG. 31 shows the container from the front. Guided in the housing 800 are five slides 801, the cover 802 of which is divided into an upper portion 803, which can receive a label, and a lower portion with a button 804.

The housing 800 possesses a foot 805 which may be seen as a continuous edge web in FIG. 32 and which has, in its corner round-out portions, circular receptacles 806 for locking feet 811 which can be inserted to glued in. The stop noses 808 of the slides run in the parallel slits 807 in the housing bottom and limit the pushing-out distance of these slides.

Figure 33:
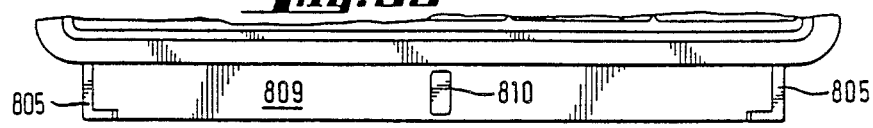

According to FIG. 33, the foot 805 can be designed as a lateral guide for a flat drawer 809 with a handle 810; information material on the recordings on the inserted cassettes can be accommodated in such a drawer.

The notch 812 in the foot serves as centering during stacking, and for this purpose a complementary centering stud 813 is provided on the top side of the housing. Also molded to the housing 800 at the rear are lateral spacer studs 814 for lining several identical containers up against one another laterally. The front housing collar 815 is slightly higher than the cover wall 816 of the housing adjoining it behind, as may be seen in FIG. 34 in which a further container is attached. The housing collar 815 is a separately produced part which is snapped onto the housing 800, specifically at several points on its periphery; such as snap connection may be seen in FIG. 36 at 817, holding-down devices 835 supporting the housing front edge from the other side.

Figure 34:
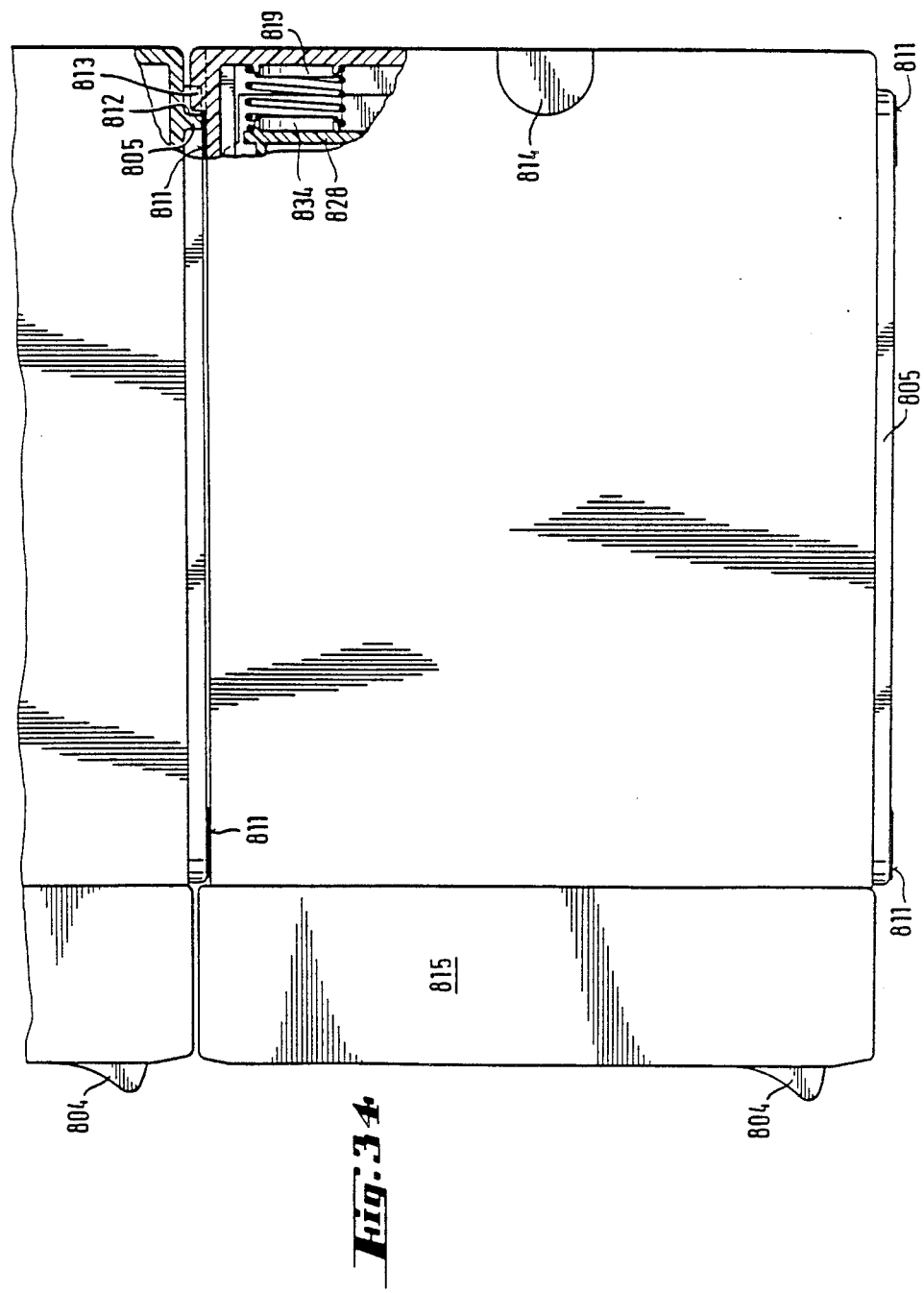
Figure 35:
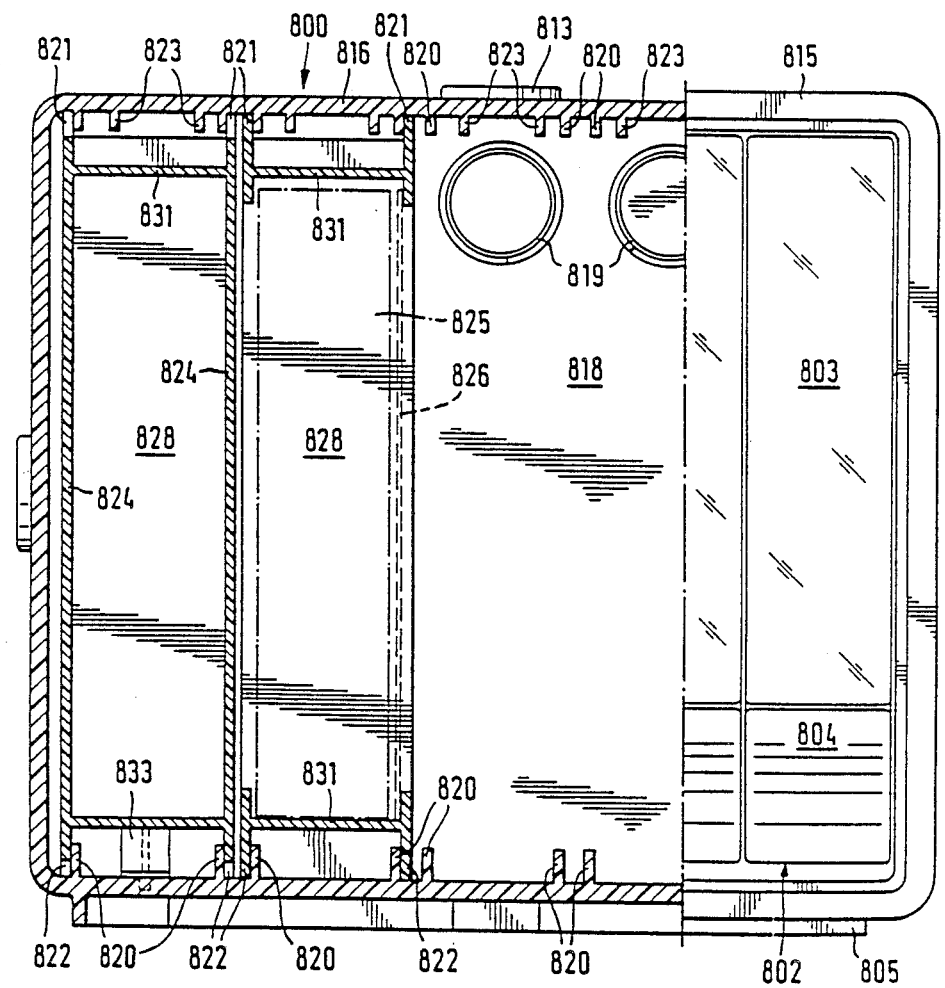

The left-hand part of FIG. 35 shows a view into a cut-away housing 800 to its rear wall 818. It may be seen in the central region of the drawing that a retaining and centering ring 819 for an ejector spring (as indicated in FIG. 34, this is a simple helical spring) is molded to the rear wall 818 for each slide in the associated housing compartment. The guide ribs 820 each engage between upper runners 821 and lower runners 822 respectively of the slide, and these have as small an area as possible to reduce the static friction; between the guide ribers there are further webs 823 on which the slide locks, as is yet to be explained. In the left-hand receiving compartment of the housing a slide is shown in a sectional representation approximately in the plane A—A of FIG. 40, in which it has vertical struts 824. In the receiving compartment adjoining this, the slide is shown in section approximately in the plane B—B, and an inserted cassette 825 is indicated in outline by dot-and-dash lines. A program label 826 or the like, which may also be inserted, cannot impede the movement of the adjacent slide, since it is supported by the vertical struts 824.

FIGS. 40 and 45 show the slide in detail. It comprises a rear frame 827, to the rear wall 828 of which are molded, on the side facing the housing rear wall 818, a centering ring 834 corresponding to its centering ring 819, and a stiffening cross-ribbing 830. The two horizontal struts 831 have the H-profile shown in FIG. 35, the transverse leg of which is provided with weight-saving perforations 832. A carrier 833 for the above-mentioned stop nose 808 is molded on in the downwardly directed channel of the lower horizontal strut. The lateral ribbing of the vertical struts serves for dimensional stability when the frame 827 is injection molded from plastic.

There extends forwards (that is to say, to the left in FIG. 40), as a prolongation of the cross bar of the H- profile of the horizontal struts 831, a bearing lug 836 which is stepped inwards with a contour as shown by broken lines in FIG. 41. Centered on the circular arc 837 of the contour is a bearing bore 838—see FIG. 43—through which projects a bearing journal 839 on the respective horizontal arm 840 of the cover 841 which is retained as a result of snapping in. The perforations 842 on the side of the arms 840 which faces away from the bearing allow the cover to be removed from the mold during injection-molding.

Figure 36:
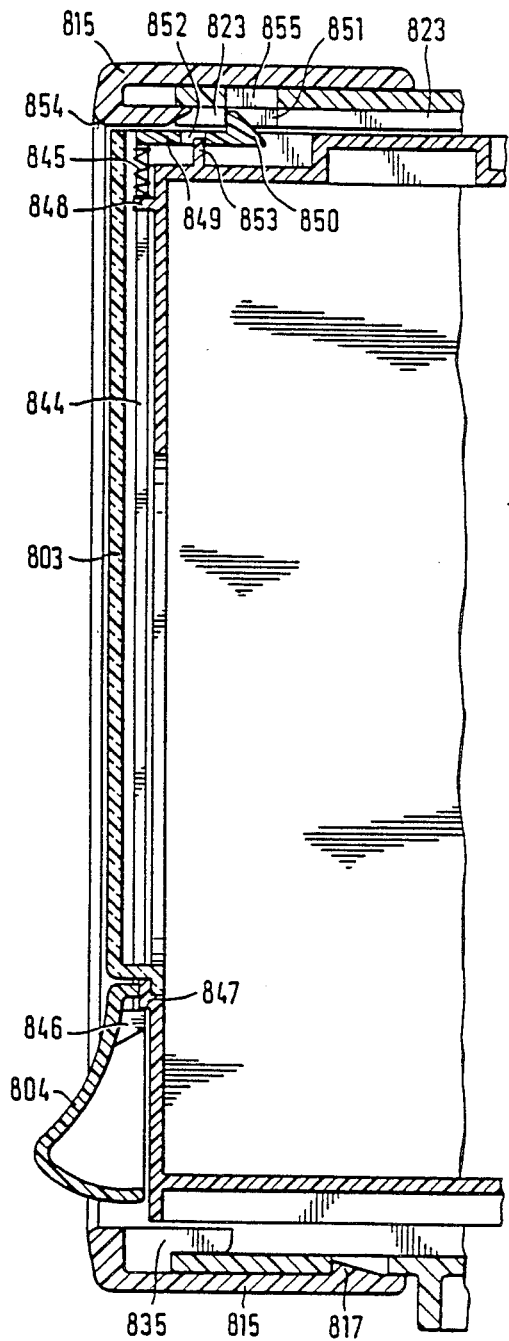
Figure 64:
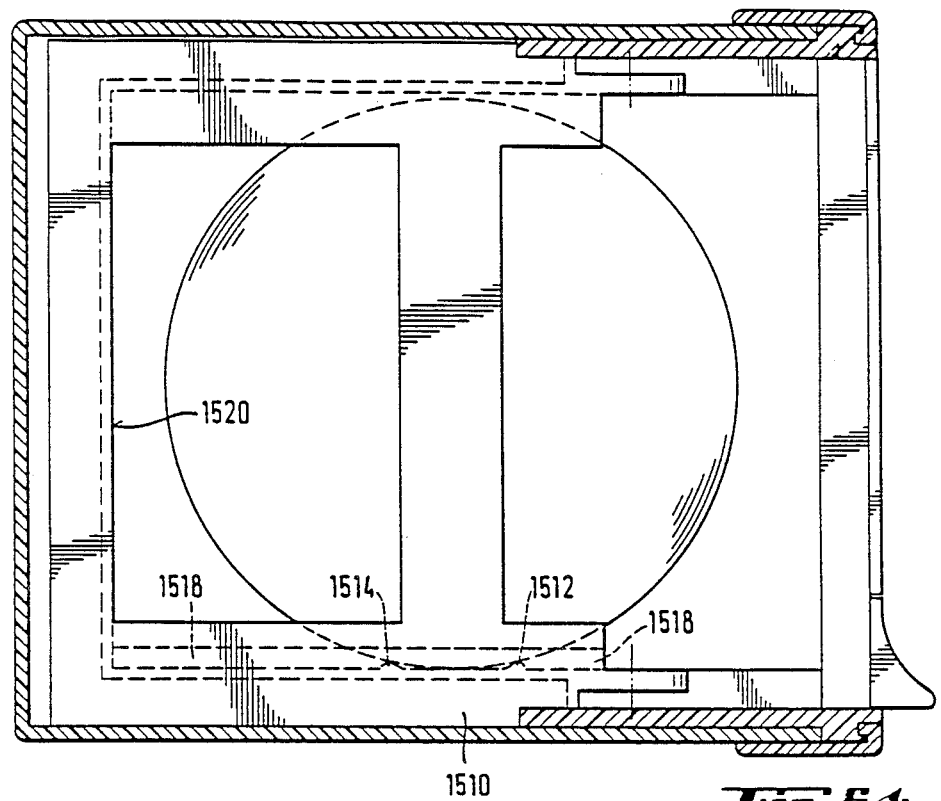

The vertical end wall 843 of the cover carries a vertically displaceable button 804 with an integral-slide bar 844, and the construction can be seen most clearly in FIG. 36.

The slide bar 844, guided on the end wall 843, is pressed upwards by a compression spring 845 into a position in which the nose 846 of the button 804 rests against an end-wall step 847. The compression spring is supported at the bottom on an end-wall extension 848 and acts at the top on a transverse arm 849 of the slide bar which, finally, covers the detent hook 850. As may be seen in FIG. 36, the detent hook 850 engages, in the push-in position, into a recess 851 of the ribs 823. There engages into a recess 852 in the transverse arm 849 a pin 853 of the cover arm, and this supports the transverse arm during the pushing-in of the slide, when the detent hook is pressed down as a result of running on to the bevelled or rounded edge 854 of the housing collar. The perforation 855, covered by the housing collar, in the housing makes it possible to provide the recess 851 by means of injection molding.

In front of the slide bar, the cover 841 carries a label window 803 made of clear or matt transparent plastic. This separately injection-molded constructional part is shown in FIG. 45; it is suspended by means of hook extensions 856 on its side edges 857 in corresponding recesses of the complementary receiving grooves 858 of the end wall 843, and a similar hook extension 859 engages through a recess in the end wall 843, approximately the size of a finger limb, and, of course, also in a correspondingly large recess in the slide bar 844 and hooks behind the former on the end wall. Fixing takes place by means of pins 860 which snap in. These recesses make an inserted label accessible, so that it can be pushed out upwards.

It goes without saying that, in a similar way to that shown in FIG. 3, a necked hinge spring, prestressing the cover 841 into the position shown in FIG. 44, is inserted in one bearing 838/839.

When the button 804 is pressed downwards, the detent hook disengages, and the ejector spring conveys the slide outwards until the nose 808 runs on at the end of the slit 807; in this position, the bearing lugs project beyond the housing collar, and the cover is pivoted up by the necked hinge spring.

FIGS. 37 to 39 show an alternative form of this embodiment, in which a lock is assigned to each container.

A conventional cylinder lock 888 in a miniature design is inserted into the button 904, and its blocking arm 961 is located, in the blocking position, in front of a molded-on peg 962 on the holding-down device 835, so that the button cannot be pressed. So that a single lock can suffice for all five compartments, there is located under the peg 962, supported inwards by a housing step 963, a displaceable blocking member 964 in the form of a strip with raised prongs 965. In the closing position of the blocking member, the prongs are located precisely in front of opposing prongs 966 molded respectively to a slide at the bottom, so that even when a button is pressed the slide cannot be pushed out. The blocking arm 961 of the cylinder lock engages between a pair of prongs 967. A compression spring 969 prestresses the blocking member in the opening position in which it rests against the stop step 968. The line 970 symbolizes the lowest plane of the bearing lug which can therefore slide beyond the prongs.

FIGS. 46 to 49 show an alternative form in which the gate is articulated on the slide in another way. There extends upwards from the slide base 1010 a cheek 1012 in which a lever arm 1014 of a gate, designated as a whole by 1016, is mounted rotatably about a pivot pin 1018. In the region o the pivot pin there is a necked hinge spring which prestresses the gate 1016 into the position shown in FIG. 49. In the end position of the gate 1016, in which the necked hinge spring 1020 is essentially relaxed, the gate reaches the position shown in FIG. 49.

The gate itself incorporates an inspection plate 1022, behind the clear front part 1024 of which a label can be inserted. In the position according to FIGS. 46 and 47, this plate 1022 is supported on the base 1010 of the slide by means of a foot 1026. The button 1028 is guided in the plate 1022 so as to be displaceable downwards by sliding and is prestressed, by a spring not shown in the drawings, into the position according to FIG. 47, from which it can be moved away downwards. During this movement away, a wedge-shaped bar 1030 is lifted out of the latch 1032 so that an ejector spring (not shown in the drawing) installed in the housing 1034 displaces the slide forwards into the extraction position. When the user removes his finger and thus ceases pressing (FIG. 48), the necked hinge spring 1020 rotates the gate into the position according to FIG. 49, in which the video cassette 1036 can be pulled out forwards in alignment with the housing orifice. To remove the cassette, this is pushed into the housing in the opposite direction up to a stop (not shown), and the operation takes place in reverse sequence, that is to say the sequence according to FIG. 49, FIG. 48 and FIG. 47. On conclusion, the user presses on the plate 1022, the button 1028 being locked again in interaction between the wedge surfaces on the wedge-shaped bar 1030 and the latch 1032.

In an alternative from indicated only in FIG. 47, the lever arm 1014' is provided with a slot 1040, so that, resting directly against the front face 1042 of the cassette, it can secure the cassette in the closing position. When the button is actuated, the slide 1010 moves out of the housing and the plate 1022 together with the button 1028 moves along the slot so that the gate assumes a position in which it can tilt upwards over the front upper end edge of the cassette.

In the embodiment according to FIGS. 50 and 51, the gate pivots about another pivot pin. The housing 1110 with three slides 1112 may be seen. One slide is in the extended state, but the botton 1116 which is rotatable about the pin 1114 and which at the same time forms a gate is still in the locking position. The button has, for example for locking, a latch 1118, and assigned to the pivot bearing 1114 is a spring (not shown), for example a necked hinge spring, which prestresses the button component, here identical to the gate, into the position shown by broken lines in FIG. 50. This end position can be secured by stops.

In the embodiment according to FIGS. 52 to 54, the gate pivots about yet another pivot pin.

The housing 1210, along which the slide 1212 is movable by sliding, may be seen here on the left in side view according to FIG. 52. The slide base has, perpendicularly to the displacement movement, a pivot bearing 1214 about which the gate 1216 is rotatable after it has been unlocked from the housing, by means of the bar 1222, as a result of relative displacement of the button 1218 counter to the effect of the spring 1220. The downward movement of the gate into the horizontal takes place as a result of the effect of gravity or a built-in spring if this is preferred.

FIGS. 55 to 60 show an alternative design of a video-cassette container for different cassette sizes. Here, FIG. 55 is a section along the line 55—55 of FIG. 56, which itself shows a vertical partial longitudinal section through the container. FIG. 57 corresponds to the lower part of FIG. 56, but in another operating position, and FIGS. 58 to 60 represent details in perspective.

The slide 1310 is shown in cross-section in FIG. 55. It has a perforation 1312 in its rear wall 1314, so that a bottom slide 1316, shown in perspective in FIG. 58, can pass through. The lateral slits 1318 in the bottom slide are guided in corresponding webs 1320 of the slide bottom; for assembly, the webs 1320 have at their free rear end noses 1322 which are pressed horizontally sideways, when the bottom slide 1316 is pushed in, and then make it impossible for the bottom slide to fall out; the ends of the two webs are shown in FIGS. 59 and 60 respectively. The bottom slide has an upwardly projecting tab 1324 which rests in each case from the rear against the rear end wall of an inserted cassette, as indicated in FIG. 56 by the dot-and-dash line 1326. An auxiliary spring 1328 presses the bottom slide 1316 in the direction of the gate 1330. The auxiliary spring 1328 is designed so that it is relaxed completely after a spring excursion (illustrated in FIG. 57. The bottom slide 1316 has a second tab 1334 on which the spring 1328 is supported. Finally, there is on the bottom slide also a stop nose 1336 which engages into the slit 1338 in the bottom side of the cassette housing and which represents the main stop for the slide. The stationary webs 1340 ensure that the auxiliary spring 1328 cannot buckle out laterally. Also to be noted are the supporting rails 1334 which project from the slide bottom to the side of the slit guides 1318 and on which the particular inserted cassette rests, so that the bottom slide 1316 is relieved of the weight of the cassette itself.

FIGS. 61 to 63 show, in a perspective representation (FIG. 61), a "tape library", that is to say a series of identical containers which are combined into a subassembly and which can all receive video cassettes, but, as is yet to be explained, also other recording media.

Here, the individual containers 1400 are equipped with housings which are cut out on the two large side faces, since according to the embodiments described above no material is required for functional purposes at these points; this serves to save material. End plates 1402 can terminate such a series of cut-out housings in an esthetically pleasing manner.

On their top edges 1404, the housings of the containers 1400 each have a rail 1405 with an undercut profile, for example a T-profile as illustrated in FIG. 61, and a cross member 1406 has cut-outs 1410, complementary to this profile, in the free legs of its U-shaped cross-section. The part side view according to FIG. 63 reveals that there is inserted in the cross member a leaf spring 1408 which extends over the entire length of the cross member and ensures that, despite the play between the T-shaped rails and the cut-outs 1410 which is due to tolerances, the containers rest somewhat firmly. FIG. 62 shows a modification of the cross member which is here supplemented by an angle piece 1412 by means of which the cross member can be screwed to the wall.

Figure 65:
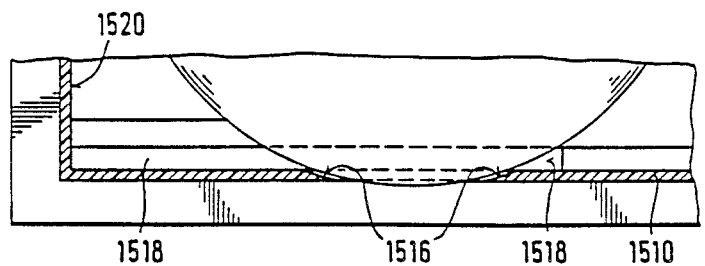
Figure 66:
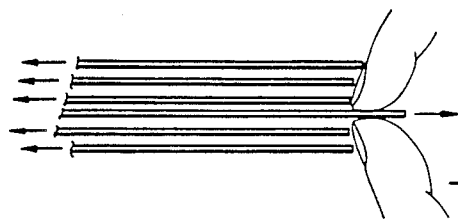
Figure 67:
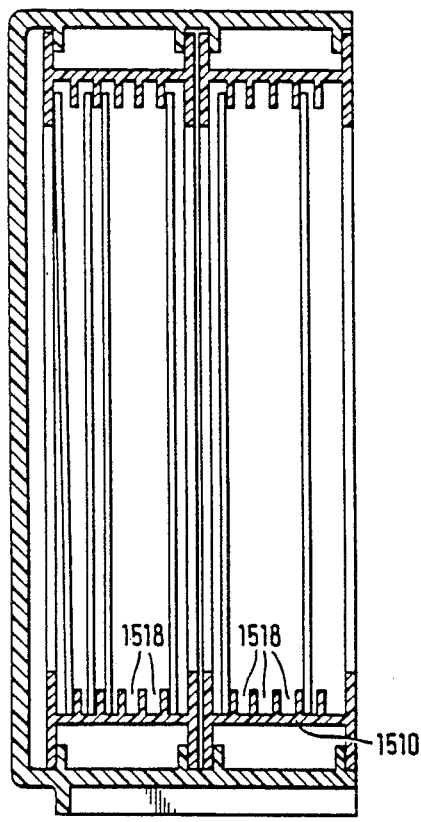

FIGS. 64 to 70 show modifications especially of the slide for receiving other recording media, namely so-called compact disks. The slide base 1510 has either a front stud 1512 and a rear stud 1514 or, as shown as an alternative in FIG. 65, slot-like depressions 1516, the contour of which, as may be seen in FIG. 65, is basin-shaped or trough-shaped. Between the studs 1512 and 1514 or the depressions 1516 there are grooves 1518 which make it easier to push in the compact disks. When a relatively large number of compact disks are accommodated close to one another in the slide, as illustrated in FIG. 67, it is possibly difficult for the user to grasp a desired disk with his finger tips. For this reason, the construction is such that the user can press away to the rear disks located adjacent to the one which the desires (see FIG. 66). The distance between the rear wall and the position of the stud 1514 or rear limitation of the slit 1516 is such that the center of gravity of the "disks" is always located within the region limited by the studs 1512 and 1514 or within the region above the slit 1516, so that the pressed-back "disks" can return again into their position of rest under the effect of gravity. Alternatively, a spring which presses the "disks" back into their initial position can be provided on the rear wall 1520: see the diagrammatic representation in FIG. 69 where the spring 1524 may be seen.

Figure 70:
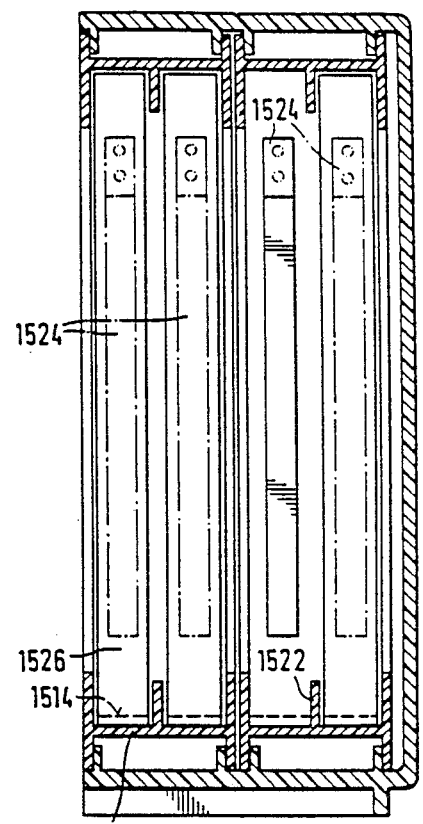
Figure 68:
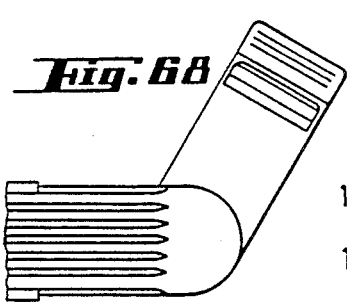
Figure 69:
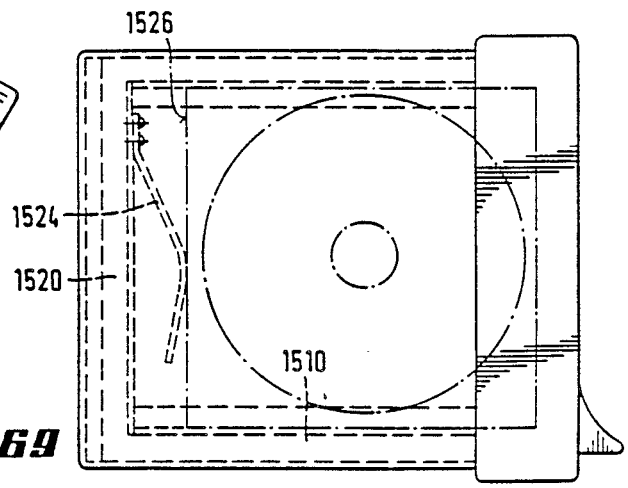

FIGS. 67 and 70 show partial cross-section of containers with two different types of slides, of which FIG. 67 shows a design in which there are the already described guide grooves 1518, pairs of studs 1512, 1514 or depressions 1516, whereas in FIG. 70 there are separating tabs 1522 which each limit a chamber for a storage box or sales pack 1526 for an individual compact disk. As before, there can be, here also, a spring which presses the particular pack not to be extracted back into the storage position after the desired pack has been extracted; this spring is indicated by 1524 in FIG. 70, as in FIG. 69.

FIGS. 71 to 80 relative to further alternative forms of the container for storing disk-shaped data carriers, compact disks being referred to here again for the sake of simplicity.

FIG. 71 shows such a container in a diagrammatically illustrated longitudinal section, and closed. Received in the housing 1601 so as to move by sliding is the slide 1602 on which a gate 1604 is articulated pivotably about a joint 1603. Accommodated in the joint, in a similar way to the embodiments described above, is a necked hinge spring which prestresses the gate into the pivoted-away opening position, the angular position of which is determined by a stop 1605. Sliding coupling with the housing takes place via a telescopic guide so that the slide can be extended practically completely out of the housing; accordingly, an intermediate rail 1606 is also provided on both sides. The maximum pull-out distance of the intermediate rail is fixed by a stop stud 1616 which runs in a housing slot. Ribs 1615 of the housing engage round the two outer edges of the rails and thus retain in the housing the rails which themselves engage round the slide by means of similar profile hooks. This can be seen best in the cross-sectional representation according to FIG. 72.

The slide 1602 together with the gate 1604 are pushed out of the housing by compression springs 1607, as soon as the detent hook 1610 (see FIG. 74) is pushed, as a result of finger pressure on the button 1608, in the direction of the arrow 1609 out of a latch which is designed as a housing perforation.

The compact disks 1611 lie individually in plate parts 1612 which are articulated to the slide by means of pins 1613 and which can therefore pivot about pivot pins 1614. An alternative articulated connected between the plate parts 1612 and the slide 1602 is illustrated in a plan view in FIG. 76 and in a front view in FIG. 77: the end edge of the plate part has snap claws 1623 simply injection-molded on, which, when attached to pins 1633 injection-molded on the slide, spread open and thereby form a joint. Whereas FIG. 71 shows a first embodiment of such a plate part, FIG. 75 shows an alternative form which differs from the former in a stiffening peripheral edge 1617 omitted only on the front extraction side of the plate part.

The plate parts have on the extraction side a grip cut-out 1618 and in their center a projection 1619 which, in the case of abrupt opening, that is to say when pressure on the button 1608 is relaxed and the springs 1607 are fully activated, prevents the compact disks 1611 accelerated in this way from being ejected. The depth of insertion of the disks is limited by a stop strip 1620.

FIG. 74 shows the opened container in a diagrammatic side view. Here, the plate parts are fanned open, specifically as a result of the interaction of the pivoting gate 1604 with the plate parts. The gate carriers, in particular, inwardly projecting pins 1624 which abut from below against tabs 1626 of the plate parts 1612 and lift them. The tabs are long enough for the pins 1624 always to remain engaged with them despite the fact that the pins slide along on these tabs because of the different axial distances. When the gate pivots back, further pins 1625 likewise molded to the gate act from above on the tabs and bring them back into a parallel position if gravity is not sufficient or if the container is not used in the position shown; the gate could then abut by means of its front plate 1627 against the plate part located nearest to it, or the plate parts could collide with one another. As an alternative, the return of the plate parts into their parallel position could also be brought about by means of prestressing springs or other means. The bottommost plate part remains, in any case, in its initial position, supported on the stops 1629.

Instead of the retaining stud 1619, adhesion linings could also be attached to the plate parts, as indicated at 1628 in FIG. 78. The plate parts shown there also differ in another way from those of the embodiment previously described; their front on the extraction side is provided with angled lettering or labeling surfaces 1630 which overlap one another in the storage position (FIG. 78), but are clearly legible in the fannned-open extraction state, as can easily be seen.

The alternative form according to FIG. 79 is represented by an embodiment in which the plate parts are fanned open not upwards, but downwards (always on the assumption that the position shown in the drawing is the position of use). So that the disks do not fall down, a stop edge 1631 is provided. The advantage of this embodiment is that it may be easier to see into the compartments than in the embodiment previously described, especially to see the edge portions 1632 of the plate parts (FIG. 80) which are intended, here, as lettering or labeling areas.

Apart from the components which are constantly prestressed elastically, such as the springs 1607, all the components are preferably designed as plastic injection-moldings. As is known per se, the outer sides of the housing 1601 can be provided with projections and recesses of complementary profile shape, so that identical containers can be connected positively to form larger units.

I claim:

1. A container for the storage of articles, such as magnetic tape cassettes, compact phonographic disks, or other recording media, comprising:
   a housing having an opening in one side thereof,
   a transport slide guided in said housing for movement relative to said housing,
   an ejector spring operatively connected between said slide and said housing and adapted to convey said slide relative to said housing into an extraction position for the extraction of the article stored in said housing,
   a locking means for locking said slide in a stored position in said housing against the bias of said ejector spring,
   a front plate carried by said slide and closing said opening when said slide is locked by said locking means,
   a pivotable connecting means between said slide and said front plate and said housing for transmitting, and said front plate such that said front plate is pivotable between a first storage position and a second extraction position when said slide is in said extraction position, and
   a transmission means operatively connected between said front plate and sid housing for transmitting, upon said movement of said slide relative to said housing, a torque to said front plate tending to pivot said front plate into said second extraction position.

2. The container of claim 1 including, said transmission means comprising a housing guide path means and front plate portions guided along said housing guide path means.

3. The container of claim 2 including,
   said pivotable connecting means defining a pivot axis and
   said front plate portions being pin-shaped, and having pin axes extending parallel to said pivot axis.

4. The container of claim 1 including,
   said front plate being positioned in a plate and pivotable about an axis extending parallel to said plane and orthogonally relative to the movement of said slide.

5. The container of claim 4 including,
   a web integrally formed with said front plate, and
   said axis extending through said web extending orthogonally with respect to the plane thereof.

6. The container of claim 5 including,
   said slide including brackets extending parallel to said web and intersected by said axis.

7. The container of claim 2 including,
   said pivotable connecting means defining a pivot axis, and
   said guided front plate portions being pin-shaped, and having pin axes extending parallel to said pivot axis.

8. A container for the storage of articles, such as magnetic tape cassettes, compact phonographic disks, or other recording media, comprising:
   a housing having an opening in one side thereof,
   a transport slide guided in said housing for movement relative to said housing,
   an ejector spring operatively connected between said slide and said housing and adapted to convey said slide relative to said housing into an extraction position for the extraction of the article stored in said housing,
   a locking means for locking said slide in a stored position in said housing against the bias of said ejector spring,
   a front plate carried by said slide and closing said opening when said slide is locked by said locking means,
   a connecting means between said slide and said front plate for connecting said slide and said front plate such that said front plate is movable between a first storage position and a second extraction position angularly offset from said storage position when said slide is in said extraction position, and
   a transmission means operatively connected between said front plate and said housing for transmitting, upon said movement of said slide relative to said housing, a torque to said front plate tending to pivot said front plate into said second extraction position.

9. A container for the storage of articles, such as magnetic-tape cassettes, compact phonographic disks, or other recording media, comprising:
   a housing having an opening in one side thereof,
   a transport slide guided in said housing for translational sliding movement relative to said housing,
   an ejector spring operatively connected between said slide and said housing and adapted to convey said slide relative to said housing into an extraction position for the extraction of the article stored in said housing,
   a locking means for locking said slide in a stored position in said housing against the bias of said ejector spring,
   a front plate carried by said slide and closing said opening when said slide is locked,
   a connecting means between said slide and said front plate for connecting said slide and said front plate such that said front plate is movable between a first storage position and a second extraction position angularly offset from said storage position when said slide is in said extraction position, and
   a spring means operatively connected to said front plate and said slide for moving said front plate to said extraction position even when said housing is oriented so that said second extraction position is above said first storage position.

10. The container of claim 9 including,
   said slide having a bottom plate extending substantially parallel to said translational sliding movement,
   said bottom plate having a main portion and a secondary portion which forms a subassembly with said front plate, and
   said bottom plate having a hinge portion whose hinge axis extends orthogonally with respect to said translational sliding movement and separates said main portion from said secondary portion.

11. The container of claim 10 including,
   said housing walls including housing slots extending orthogonally relative to said hinge axis.

12. The container of claim 10 including,
   said spring means being disposed at said hinge portion.

13. The container of claim 12 including,
   said spring means comprising a metallic spring.

14. The container of claim 10 including,
   said hinge portion being injection-molded and integral with said bottom plate portions.

15. The container of claim 10 including,
   said hinge axis being positioned out of said housing when said slide is in said extraction position.

16. The container of claim 15 including,
   a stop means for defining at leaset one of said front plate pivot positions.

17. The container of claim 10 including,
   a stationary guide means provided at said housing, and
   said front plate subassembly including a longitudinal guide means cooperating with said stationary guide means.

18. The container of claim 17 including,
   said housing walls including housing slots extending orthogonally relative to said hinge axis, and
   said housing slots and said stationary guide means being positioned in the same housing walls.

19. The container of claim 9 including,
   said front plate subassembly comprising a slot bottom portion which, with said slide in its stored position extends parallel to its translational sliding movement direction, and
   said locking means being positioned at said front plate assembly.

20. The container of claim 19 including,
   said locking means being integrally molded with said front plate subassembly.

21. A container for the storage of articles, such as magnetic-tape cassettes, compact phonographic disks, or other recording media, having opposing top and bottom flat sides, comprising:
   a housing having an opening in one side thereof,
   a transport slide guided in said housing for movement relative to said housing,
   an ejector spring operatively connected between said slide and said housing and adapted to convey said slide relative to said housing into an extraction position for the extraction of the article stored in said housing,
   a locking means for locking said slide in a stored position in said housing against the bias of said ejector spring,
   a front plate carried by said slide and movable by said ejector spring between a storage position generally closing said opening when said slide is locked by said locking means and an extraction position angularly offset from said storage position and from the longitudinal axis of said slide so that the article contained by said slide can be grasped on its opposing flat sides and removed from said slide unobstructed by said front plate, and
   a transmission means operatively connected between said front plate and said housing for transmitting, upon said movement of said slide relative to said housing, a torque to said front plate tending to displacement said front plate into said extraction position.

* * * * *